United States Patent
Visel

(10) Patent No.: US 10,599,775 B2
(45) Date of Patent: *Mar. 24, 2020

(54) AUTOMATED COMPREHENSION OF NATURAL LANGUAGE VIA CONSTRAINT-BASED PROCESSING

(71) Applicant: Thomas A. Visel, Austin, TX (US)

(72) Inventor: Thomas A. Visel, Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/927,234

(22) Filed: Mar. 21, 2018

(65) Prior Publication Data

US 2018/0217982 A1   Aug. 2, 2018

Related U.S. Application Data

(63) Continuation of application No. 14/675,949, filed on Apr. 1, 2015, now Pat. No. 9,984,067.

(60) Provisional application No. 61/981,557, filed on Apr. 18, 2014.

(51) Int. Cl.
   *G06F 17/27* (2006.01)

(52) U.S. Cl.
   CPC ............... *G06F 17/2785* (2013.01)

(58) Field of Classification Search
   CPC ............ G06F 17/2785; G06F 17/30734
   See application file for complete search history.

(56) References Cited

U.S. PATENT DOCUMENTS

| | | |
|---|---|---|
| 7,089,218 B1 | 8/2006 | Visel |
| 7,480,640 B1* | 1/2009 | Elad ................. G06Q 10/10 706/14 |
| 7,849,034 B2 | 12/2010 | Visel |
| 7,925,492 B2 | 4/2011 | Visel |
| 8,001,067 B2 | 8/2011 | Visel et al. |
| 8,892,423 B1* | 11/2014 | Danielyan ......... G06F 17/2785 704/10 |
| 2006/0074980 A1* | 4/2006 | Sarkar .................. G06F 16/958 |
| 2008/0228467 A1* | 9/2008 | Womack ............... G06F 17/271 704/9 |

(Continued)

OTHER PUBLICATIONS

Visel, "Automated Comprehension of Natural Language via Constraint-Based Processing", U.S. Appl. No. 14/675,949, filed Apr. 1, 2015, Non-Final Office Action dated Aug. 15, 2016.

(Continued)

*Primary Examiner* — Walter Yehl
(74) *Attorney, Agent, or Firm* — Brian F. Russell; Russell Ng PLLC

(57) ABSTRACT

A consistent meaning framework (CMF) graph including a plurality of nodes linked by a plurality of edges is maintained in data storage of a data processing system. Multiple nodes among the plurality of nodes are meaning nodes corresponding to different word meanings for a common word spelling of a natural language. Each of the multiple word meanings has a respective one of a plurality of associated constraints. A natural language communication is processed by reference to the CMF graph. The processing includes selecting, for a word in the natural language communication, a selected word meaning from among the multiple word meanings based on which of the plurality of associated constraints is satisfied by the natural language communication. An indication of the selected word meaning is stored in data storage.

24 Claims, 16 Drawing Sheets

(56) References Cited

U.S. PATENT DOCUMENTS

| | | | |
|---|---|---|---|
| 2008/0243741 A1* | 10/2008 | Visel | G06N 3/02 |
| | | | 706/41 |
| 2009/0024385 A1* | 1/2009 | Hirsch | G06F 17/2705 |
| | | | 704/9 |
| 2010/0042566 A1 | 2/2010 | Visel | |
| 2010/0042568 A1 | 2/2010 | Visel | |
| 2010/0088262 A1 | 4/2010 | Visel et al. | |
| 2010/0185437 A1 | 7/2010 | Visel | |
| 2011/0119047 A1* | 5/2011 | Ylonen | G06F 17/2785 |
| | | | 704/9 |
| 2011/0119049 A1* | 5/2011 | Ylonen | G06F 17/271 |
| | | | 704/9 |

OTHER PUBLICATIONS

Visel, "Automated Comprehension of Natural Language via Constraint-Based Processing", U.S. Appl. No. 14/675,949, filed Apr. 1, 2015, Final Office Action dated Feb. 22, 2017.

Visel, "Automated Comprehension of Natural Language via Constraint-Based Processing", U.S. Appl. No. 14/675,949, filed Apr. 1, 2015, Non-Final Office Action dated Jul. 25, 2017.

Visel, "Automated Comprehension of Natural Language via Constraint-Based Processing", U.S. Appl. No. 14/675,949, filed Apr. 1, 2015, Notice of Allowance dated Jan. 31, 2018.

* cited by examiner

| Meaning | Parent | Sense |
|---|---|---|
| about | preposition | "location" |
| about | preposition | "approximation" |
| about | preposition | "associated with" |
| about | preposition | "around" |
| about | preposition | "time" |
| about | preposition | "epoch" |
| about | preposition | "measurement" |
| about | preposition | "quantity" |

*Figure 6*

| Meaning | Parent | Sense |
|---|---|---|
| period | time (duration) | "time per cycle" |
| period | time (epoch) | "epoch" |
| period | duration | "duration" |
| time period | period (epoch) | "epoch" |
| period | time (duration) | "time period" |
| epoch | period (epoch) | "time period" |
| epoch | period (epoch) | "geological period" |
| eon | period (epoch) | "time period" |
| eon | period (epoch) | "duration" |
| era | period (epoch) | "geological period" |
| period | time (epoch) | "geological period" |

*Figure 7*

| right span 1004a | right SDT 1006a | token 1000 | left SDT 1008a | left span 1010a |
| --- | --- | --- | --- | --- |
| ⋮ | ⋮ | token metadata 1002 | ⋮ | ⋮ |
| right span 1004m | right SDT 1006m | | left SDT 1008n | left span 1010n |

| right span 1004a | right SDT 1006a | token 1000 | left SDT 1008a-1008d | left span 1010a-1010d |
|---|---|---|---|---|
| 1 | N | weekend | N | 1 |
| | | token metadata 1002 | NP | 3 |
| | | | EPOCH | 3 |
| | | | PP | 4 |

*Figure 14*

Activity Group (AG) 1900

| Type (optional) 1902 |
|---|
| Property Map 1904 |

*Figure 19*

Current Context Data Structure (CCDS) 2000

|  |  | Actor | Patient | Topic | Experiencer | ... | Flags |
|---|---|---|---|---|---|---|---|
| Activity Group 1 |  |  |  |  |  |  |  |
| Activity Group 2 |  |  |  |  |  |  |  |
| Activity Group 3 |  |  |  |  |  |  |  |
| Activity Group 4 |  |  |  |  |  |  |  |
| ... |  |  |  |  |  |  |  |
| Activity Group *N* |  |  |  |  |  |  |  |

*Figure 20*

AUTOMATED COMPREHENSION OF NATURAL LANGUAGE VIA CONSTRAINT-BASED PROCESSING

BACKGROUND OF THE DISCLOSURE

The present disclosure relates to data processing, and more specifically, to automated comprehension of natural language via constraint-based processing.

The ubiquity of electronic devices and communication connectivity (e.g., via wired and wireless networks including the Internet) has propelled two historic trends, a hyperbolic increase in the volume of natural language material that is being created and/or made available to the public in electronic form and a shift in human communication away from the spoken and printed word to electronic communication media (e.g., electronic documents, chat, texting, video, email, streaming, blogs, web sites, etc.).

This explosion in the volume of natural language material available in electronic form has created a technological problem that did not heretofore exist, namely, a need to digest this "ocean" of electronically formatted material to distill out information relevant to a particular individual, group of individuals, enterprise or entity. Parsing may be utilized in an attempt to identify the relevant information.

As utilized herein, parsing is defined as the analysis of a text string by decomposing the text string into its syntactic components, such as words, phrases and parts of speech. Automated parsing of artificial languages, such as programming languages and scripts, can be easily implemented in computer systems given the rigorously defined syntax employed by most programming languages and scripts. Automated parsing of communication in natural (human) languages has proven to be a greater technological challenge for a variety of reasons.

For example, some natural languages such as English have irregular grammar with many exceptional conditions, idioms, multi-word concepts and other irregularities. In the prior art, it has been difficult to program a parser to identify and distinguish between all such irregularities. Additionally, in some natural languages such as English a given spelling of a word may have as many as fifteen or twenty unique meanings, often spanning multiple parts of speech. Further, it is not uncommon for spoken and written natural language to also be characterized by broken grammatical and spelling rules, ill-chosen words, incomplete fragments, and varied writing and speaking styles. For example, natural human language frequently includes idioms, phrases with non-grammatical structure, plays-on-words, implied sentence subjects or objects, and implied or misplaced prepositions. Further, written or spoken conversations often communicate a complete thought using sentence fragments containing no subject, a subject and no verb, a prepositional phrase (especially in reply to a question), or even a non-word vocalization.

Despite these departures from regular grammar, a human reader or listener can usually intuitively comprehend the meaning intended by a human writer or speaker, for example, by the word choice, context and ordering of the words, and if the words are spoken, by the tone, inflection and pacing of the words. However, in practice, it has proven difficult for automated parsing to achieve the same degree of success in identifying the meaning of natural language communication.

BRIEF SUMMARY

In some embodiments, a consistent meaning framework (CMF) graph including a plurality of nodes linked by a plurality of edges is maintained in data storage of a data processing system. Multiple nodes among the plurality of nodes are meaning nodes corresponding to different word meanings for a common word spelling of a natural language. Each of the multiple word meanings has a respective one of a plurality of associated constraints. A natural language communication is processed by reference to the CMF graph. The processing includes selecting, for a word in the natural language communication, a selected word meaning from among the multiple word meanings based on which of the plurality of associated constraints is satisfied by the natural language communication. An indication of the selected word meaning is stored in data storage.

BRIEF DESCRIPTION OF THE SEVERAL VIEWS OF THE DRAWINGS

FIGS. 6-7 are tables summarizing content of portions of one or more CMF graphs containing meaning signatures for various meanings of the words "about," "period," "time period," "epoch," "eon," and "era";

FIG. 14 depicts the token storage area of a token following constraint-based parsing of the exemplary sentence of FIG. 9 in accordance with one embodiment;

FIG. 19 illustrates an exemplary data structure, referred to herein as an activity group (AG), which can be utilized to store metadata for an independent or dependent sentence clause in accordance with one embodiment; and FIG. 20 depicts one manner in which multiple AGs as illustrated in FIG. 19 can be structured within data storage to provide a current communication context for a stream of communication provided by a natural language communication source.

DETAILED DESCRIPTION

Figure 1:
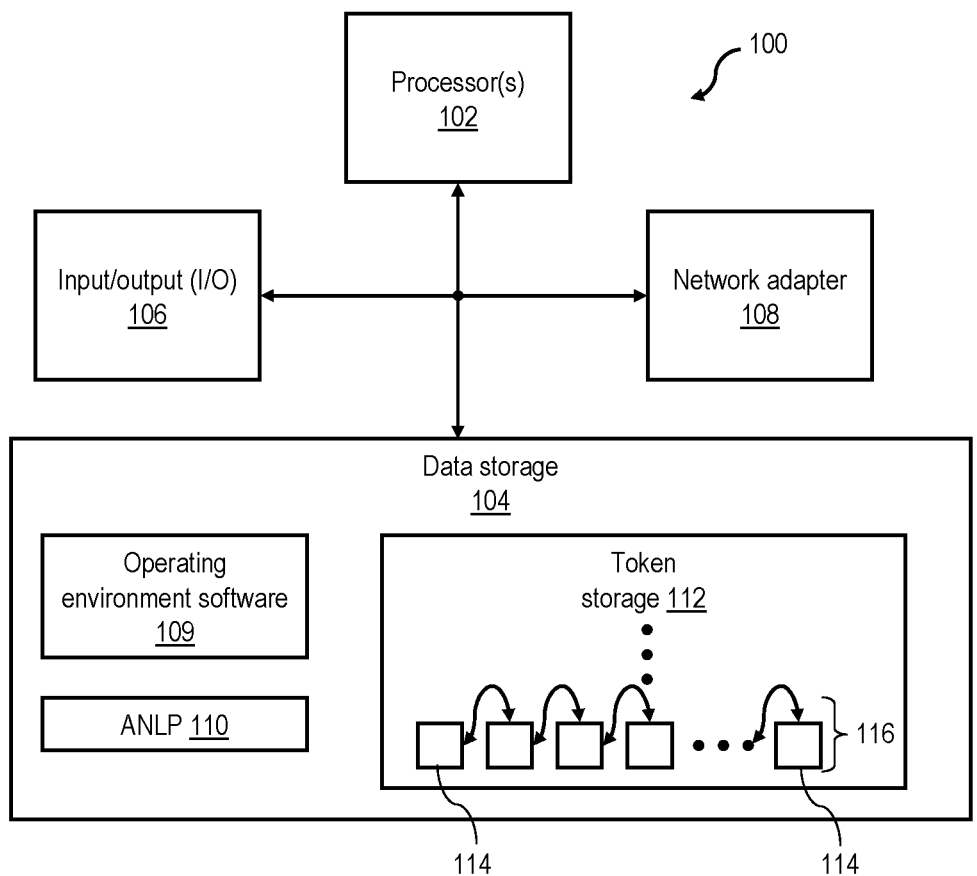
FIG. 1 is a high level block diagram of an exemplary data processing environment in accordance with one embodiment.

Disclosed herein are methods, systems and articles of manufacture (e.g., program products) that provide automated comprehension of natural (human) language communication via constraint-based processing. In one embodiment, an automated natural language processor (ANLP) has the capability of not only recognizing words and low level parsing information, but also comprehending, using non-statistical techniques, higher level information, such as idioms, sentence structures, emotional content, and human intention. As described further herein, in at least one embodiment, the ANLP harnesses a number of features, including: (1) a consistent meaning framework (CMF) data structure that provides both what-it-is and what-it-means information for word spellings, (2) constraints that differentiate meanings of a common word spelling, and (3) application of the constraints in context to match word meanings to words in the communication using directional scans. In this manner, an ANLP as described herein can successfully comprehend divergent types of content, such as legal, medical and engineering texts, historical narrative, human speech, news reporting, emails, and general Internet or HTML content.

The following description employs a number of technical terms, which are defined as follows:
1. "causal"—A description of the cause of some action or condition, when the action is conditional, such as, "If the evening is clear, we will grill steaks."
2. "constraint"—A code applied in a word meaning's description that differentiate that particular word meaning from all others. In this description, the constraint is generally represented as a capitalized term, such as "DUR", to stipulate that the word meaning must include a duration.
3. "enumeration"—A list of names for concepts, ideas or states. For example, in this enumeration {DUR, TIME, PERSON, LIQUID}, DUR represents duration, TIME represents some form of chronological time such as 2:35 P.M. or "when the dishes are done", PERSON represents a human person, such as "John Smith", "he" or "a crowd" (of people), and LIQUID represents a liquid, such as "water", "red paint" or "slurry".
4. "exception"—A alert communicated from a lower level logic to an upper level logic of an occurrence of an event detected by the lower level logic. An exception often necessitates some form of recovery processing by the upper level logic, for example, to prompt a user to identify which of multiple meanings of a word was intended.
5. "graph"—A structure relating information nodes, where the nodes may be arranged in a form of tree. A graph may be composed of classes of things (e.g., words or meanings), instances of those classes, instance names and other pertinent information. The alternative meaning of "graph" referring to a data chart or plot is not intended.
6. "knowledge set"—A graph-based representation of words, their meanings, classes, instances of a class, and names for those instances. One example of a knowledge set may include a class of things called "human" and a particular human named "John Smith".
7. "meaning"—One of possibly multiple definitions for a word of a particular spelling. A meaning often has context-specific implications.
8. "metadata"—Information regarding data. In this disclosure, metadata can refer to parsing and semantic information gleaned, parts of speech markings and start-and-length of word matches. Metadata may also include any forms of information gleaned from a sentence, such as the topic, emotional perspective of the speaker, underlying intentions and the like. These all derive from "the data", which may be limited to the words composing one or more sentences.
9. "non-structural words"—A subset of parts of speech including (primarily) nouns, adjectives, adverbs and some verbs that change relatively rapidly (e.g., during a 200 year span of history). Examples of non-structural words include "dump", "informal", "stuffy" and the like. In a 100,000 word English vocabulary, there are estimated to be fewer than 2000 structural words, with the balance being non-structural.
10. "ontology"—A schema for how certain words relate to each other. Information in a knowledge set employed by the ANLP disclosed herein may have partially originated in an external ontology.
11. "parent"—A meaning to which a word is hierarchically linked in a data structure. For example, the parent of "alley" might be "roadway."
12. "phrasal storage"—Storage for sentences, phrases, independent clauses, dependent clauses and sentence fragments.
13. "sense"—A relationship for a word meaning that identifies a specific meaning for a word. The sense thus specifies what the meaning of a word relates to or what it means. The sense typically identifies a single meaning, although sometimes two or three meanings are reasonable. For example, the sense of "sleigh" can be "a sled-like vehicle relating to snow." The target of a sense link need not be fully defined when first used in a vocabulary, but provides a term a human would understand and assists in the disambiguation of the meaning in question.
14. "role"—The function that a word plays in a sentence. For example, a word with an actor role may be found in either the sentence subject or direct object. Perhaps 8-12 roles are classically defined, and additional ones can be defined.
15. "root word"—The form of a word from which other variant forms are derived, for example, by prefixing and suffixing. For example, "class" is the root word of the terms "classify" and "classification". This term is used for clarity here, rather than the more formal "lemma".
16. "structural words"—A word whose meaning changes slowly (e.g., over a 200 year span of history). Examples of structural words include definite and indefinite articles (e.g., "the" and "a"), prepositions, linking verbs such as "be" or "is", conjunctions like "but," and so on.
17. "token"—A collection of metadata about a single word or element of punctuation.
18. "token list"—A data structure (such as a list or array) of tokens.
19. "what-it-means"—An alternative name for a word's sense or "what-it-refers-to".
20. "what-it-is"—The class to which an entity or concept belongs; an alternative term for the meaning's class parent.
21. "what-it-refers-to"—A natural language contextual clue to a word meaning; an alternative term for a word's sense.
22. "word ending"—The ending (suffix) applied to the root word, such as "-ing" in "working." English and some other natural languages have generally consistent rules regarding the alteration of root word to permit a word ending to be suffixed.
23. "word"—The spelling for a natural language word. A word does not imply a specific meaning, but may have spelling-specific properties such as pluralization, alternative spellings and the like.

With reference now to the figures, and in particular with reference to FIG. 1, there is depicted an exemplary data processing environment in which the inventions disclosed herein may be implemented. In this example, data processing environment 100 may comprise one or more physical data processing platforms, such as server computer(s), peer computer(s), client computer(s), tablets, cell phone(s), and/or embedded processors. As shown, these one or more physical data processing platforms include one or more processors 102 for processing program code and data. Processor(s) 102 are each typically realized as a packaged integrated circuit chip and may contain one or more processing cores.

Processor(s) 102 are coupled, for example, by one or more buses or networks, to data storage 104. Data storage 104 may include, for example, cache memory, system memory (e.g., dynamic random access memory (DRAM), static RAM (SRAM), read-only memory (ROM), and/or flash memory), magnetic and/or optical disks, solid state disks, and/or the like. Processor(s) 102 are additionally coupled (e.g., by one or more buses and/or networks) to receive inputs from and to provide outputs to one or more input/output (I/O) devices 106, such as speech-to-text or text-to-speech systems, terminals, keyboards, pointing devices and displays. Processor(s) 102 are further coupled (e.g., by one or more buses and/or networks) to a network adapter 108, which can further couple data processing environment 100 via one or more wired and/or wireless, local area and/or wide area networks to one or more additional data processing systems for communication of data, programs and processing jobs.

It should be understood that in some implementations, one or more components of the physical platforms utilized to implement the claimed inventions may be virtualized. For example, in various environments, one or more of processor(s) 102, data storage 104, I/O devices 106, and network adapter 108 and/or components thereof may be virtualized and implemented in a software abstraction running on a physical platform.

As further illustrated in FIG. 1, data storage 104 stores program code, such as operating environment software 109, such as a virtual machine monitor (VMM), operating system, and/or virtual machine. The program code additionally includes an automated natural language processor (ANLP) 110, which is described in detail below. In alternative embodiments, ANLP 110 can optionally be implemented partially or fully in hardware (including programmable logic) and/or firmware. In other embodiments, ANLP 110 and each of its constituent components can be implemented in a combination of hardware, program code (software) and/or firmware. Data storage 104 further includes token storage 112, which may be allocated, for example, by operating environment software 109 or ANLP 110 as a heap. Use of token storage 112 and the individual token storage areas 114 resident therein are described in greater detail below. As also described below, data storage 104 may include one or more additional data structures supporting and/or storing inputs and/or outputs of the processing performed by ANLP 110.

Figure 2:
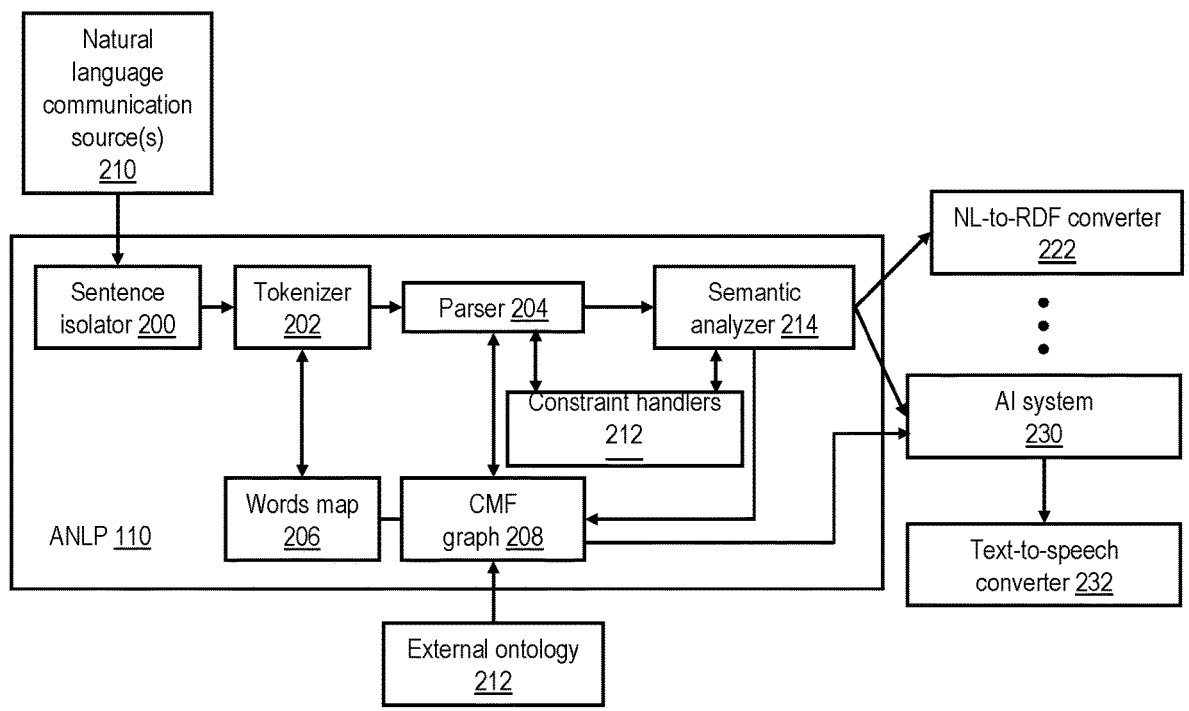
FIG. 2 is a high level block diagram of a system including an exemplary automated natural language processor (ANLP) in accordance with one embodiment.

Referring now to FIG. 2, there is depicted a more detailed view of components of an exemplary ANLP 110 in accordance with one embodiment. In the illustrated embodiment, ANLP 110 includes a sentence isolator 200. Sentence isolator 200 extracts sentences (or sentence fragments) from one or more of a variety of natural language communication source(s) 210, such as web pages, RSS feeds, streaming audio or video content, social media web pages, emails, electronic documents, a speech-to-text converter, keyboard input, etc. In some embodiments, sentence isolator 200 may itself include a speech-to-text converter rather than merely receiving the textual output of a speech-to-text converter. In at least one embodiment, sentence isolator 200 may employ conventional techniques to isolate individual sentences or sentence fragments, for example, based on punctuation, capitalization, page, column and line breaks, embedded codes (e.g., hypertext markup language (HTML) or extended markup language (XML) codes), and/or pauses in speech found within or communicated in association with the natural language content. In some alternative embodiment to that illustrated, sentence isolator 200 may be implemented separately from ANLP 110 and provide as inputs to ANLP textual sentences and/or sentence fragments extracted from natural language communication source(s) 210.

Sentence isolator 200 is logically coupled to a tokenizer 202. Tokenizer 202 tokenizes each of a plurality of sentences or sentence fragments isolated by or received from sentence isolator 200 into a respective series or sequence of tokens, where each token corresponds to an individual word or punctuation mark in the associated sentence or sentence fragment. As part of this tokenization process, tokenizer 202 references a data structure, referred to herein as words map 206, which contains spellings of root forms of words and root words-with-endings (i.e., words). Words map 206 may further specify the natural human language or languages associated with each spelling. Language detection may alternatively be provided by natural language communication source(s) 210 or sentence isolator 200. In addition, tokenizer 202 initiates allocation in token storage 112 of a respective token storage area 114 for each token. As illustrated in FIG. 1, the relationship between the tokens is also preferably reflected by linking the token storage areas 114 corresponding to a given sentence or sentence fragment to form a token list 116.

The tokens generated by tokenizer 202, which may be stored in token storage 112, form inputs of a parser 204. Parser 204 parses sentences and/or sentence fragments (i.e., the corresponding tokens) by reference to the contents of a data structure, referred to herein as consistent meaning framework (CMF) graph 208, by calling or more constraint handlers 212. CMF graph 208 stores meaning signatures of word spellings found in words map 206. Although in some embodiments words map 206 and CMF graph 208 can be combined into a unitary data structure, in a preferred embodiment, words map 206 is implemented separately from CMF graph 208 as an key-value index into the meaning signatures. Words map 206 and CMF graph 208 can each be implemented, for example, utilizing a database, such as a SQL relational database or \RDF triplestore database. As further indicated in FIG. 1, CMF graph 208 may obtain at least some of its content from one or more external ontologies 212, such as open-source and/or or proprietary human-readable dictionaries and/or encyclopedias, which may be accessible to ANLP 110 via a network, such as the Internet. In this manner, ANLP 110 need not build CMF graph 208 entirely from processed natural language communication, but can leverage existing ontologies.

The outputs of parser 204, which may again be stored in token storage 112, are provided to a semantic analyzer 214. Semantic analyzer 214 performs semantic analysis on a sentence (or sentence fragment) based on the results of the processing performed by parser 204. Semantic analyzer 214 enriches the parsing performed by parser 204 to determine additional higher level information, including information relating to emotion and authorial intent, from the sentence or sentence fragment. The information determined by semantic analyzer 214 can include, for example, a specific word meaning (e.g., 1-of-N possible meanings of a word spelling in the sentence), emotion conveyed, linguistic roles, sentence topic, and a summary of the meaning of the sentence. As indicated, semantic analyzer 214, like parser 204 employs constraint-based processing and accordingly invokes constraint handlers 212 in the course of its semantic analysis.

The output of semantic analyzer 214 can be provided to a variety of additional application programs for further processing. These additional application programs can include, for example, natural language (NL)-to-Resource Description Framework (RDF) converter 222 and an artificial intelligence (AI) system 230. Based on the information provided by semantic analyzer 214, AI system 230 can provide further outputs, such as decisions, generated text responding to the sentence (e.g., answers to questions), and reference information for future decisions. As further indicated in FIG. 2, the outputs of AI system 230 can be converted from textual format to human speech by text-to-speech converter 232. Further, the outputs of AI system 230 can be utilized to augment and/or refine the meaning signatures in CMF graph 208 in an automated manner.

As indicated above, in a preferred embodiment, ANLP 110 provides the capability not only to parse communication, but also to provide higher level information signifying some level of comprehension of the natural language communication. Table I below provides a useful guide to levels of comprehension that may be achieved.

TABLE I

| Comprehension level | Processing stage | Information type |
|---|---|---|
| High level comprehension | Semantic analysis | predictor of future intent<br>cultural, political, religious implications of content<br>emotional implications of content<br>invalid premises underlying the content<br>intention, positions and goals, causality |
| Mid-level comprehension | Semantic analysis | cause-effect and inferential source content<br>classical linguistic roles (e.g., actor or experiencer, tool or means, goals and the like)<br>sentence structures (e.g., subject, predicate, direct object, indirect object, object of the preposition, etc.)<br>clausal structures (e.g., dependent or independent clauses, locatory references, etc.) |
| Low level comprehension | Parsing | meta structures (e.g., identification, time, location, social groupings, topic, media, etc.)<br>phrasal structures (e.g., noun phrases, prepositional phrases, infinitive phrases, etc.)<br>idiomatic semantics (e.g., multi-word verbs or nouns, idioms, etc.)<br>parts of speech (e.g., noun, verb, preposition, adjective, adverb, determiner, etc.) |

In Table I, the information that ANLP 110 can glean from natural language communication is roughly ordered from the highest level comprehension (corresponding to the most specific information regarding the content of the natural language communication) to the lowest level comprehension (corresponding to the most general, most basic, or least specific information). As indicated, the low level comprehension information (e.g., parts of speech, idiomatic semantics, phrasal structures, and meta structures) is discovered by parser 204 using constraint-based parsing, as described further herein. Mid-level information and high level comprehension information can subsequently be discovered by semantic analyzer 214 using constraint-based semantic analysis, as described further herein.

Figure 3:
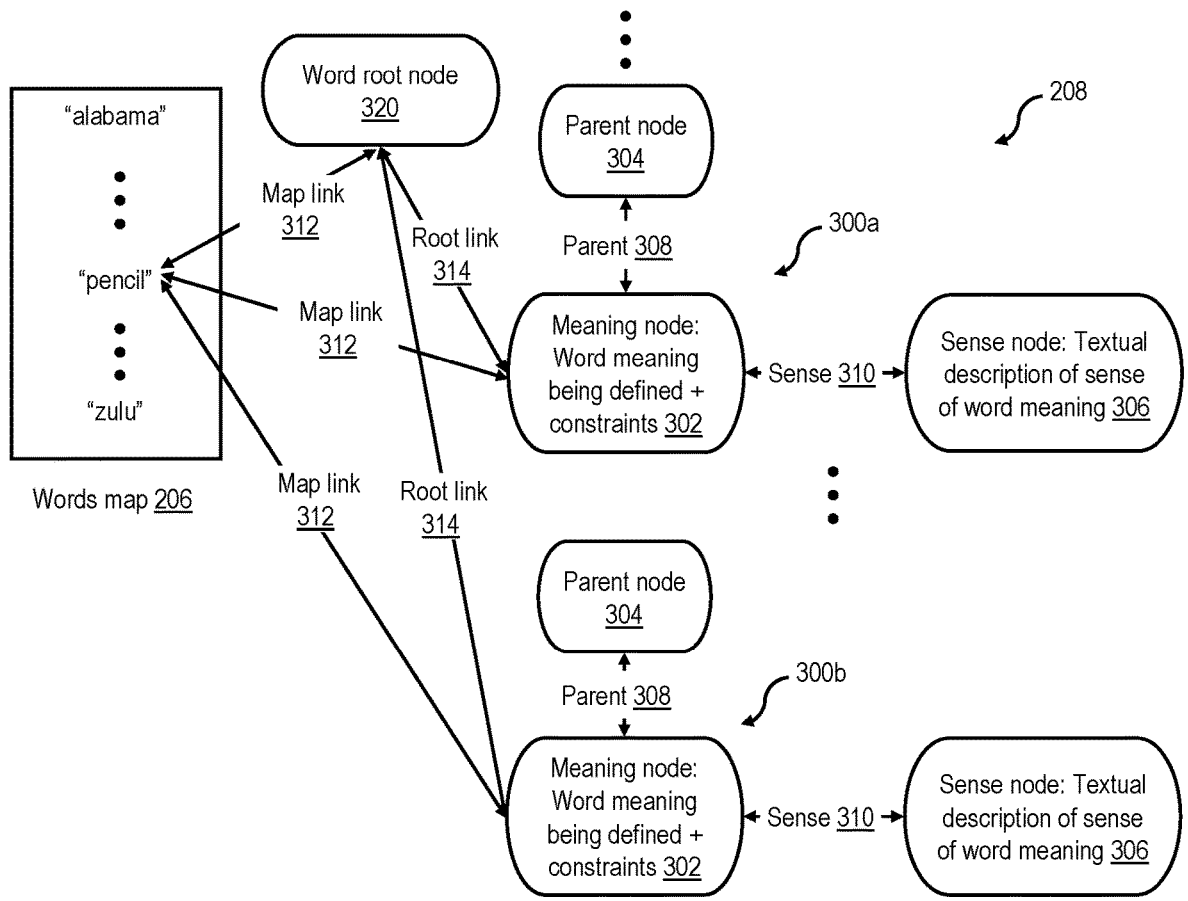
FIG. 3 illustrates an exemplary embodiment of a consistent meaning framework (CMF) graph in accordance with one embodiment.

With reference now to FIG. 3, there is illustrated an exemplary embodiment of a portion of a CMF graph 208 in accordance with one embodiment. In the depicted embodiment, CMF graph 208 includes a meaning signature 300*a* or 300*b* (generally referenced as meaning signature 300) for each meaning of each word spelling in words map 206. For example, if there are 150,000 word spellings in words map 206 and an average of ten meanings for each word spelling, CMF graph 208 will contain 1,500,000 meaning signatures. In at least some embodiments, ANLP 110 builds meaning signatures 300 in CMF graph 208 from information contained in one or more external ontologies 212. In at least some embodiments, ANLP 110 can build additional meaning signatures 300 from parsed text and/or based on feedback from AI system 230.

As shown, each meaning signature 300, which uniquely defines an individual meaning of a word spelling, includes at least three nodes, namely, a meaning node 302, a parent node 304 and a sense node 306. In a preferred embodiment, meaning node 302 identifies (within natural language text) the word being defined (i.e., its spelling) and may provide one or more constraints appropriate for the associated meaning. Parent node 304 identifies a hierarchical class of the word being defined (the hierarchical class itself providing another meaning). Sense node 306 provides a natural language textual description of the sense of the word meaning. Meaning node 302 is hierarchically linked with parent node 304 by a parent link (edge) 308 and is further linked to sense node 310 by a non-hierarchical sense link (edge) 310. Parent link 308 thus provides a "what-it-is" (subclass-of) connection, and sense link 310 provides a "what-it-means" (or "what-it-refers-to") connection, defining the sense of the word. Parent link 308 and sense link 310 are preferably implemented as bi-directional links to facilitate traversal of CMF graph 208. As further illustrated in FIG. 3, meaning node 302 may optionally be further linked to the associated word in words map 206 by a map link 312.

As an example, in one meaning signature 300a for the word "pencil", the meaning node 302 may store the word meaning "pencil", the sense node 306 may store the text "paper" to indicate what the sense of this meaning is (i.e., what it refers to), and the parent node 304 may store the term "writing instrument" to indicate the class of entity or concept to which the meaning belongs. In this case, the parent node 304 for "pencil" (which stores the term "writing instrument", for example) is itself a meaning node in turn having a parent link 308 linking parent node 304 to an additional higher level parent node (e.g., storing the term "communications tool"). Thus, word signatures in CMF graph 208 may have multiple levels of meaning nodes and class nodes linked hierarchically by parent links, and different word signatures may share parent, meaning, and/or sense nodes such that the word signatures sharing nodes form tree-like data structures. However, it should be understood that the CMF graph 208 need not be an essentially complete graph; each meaning node 302 (except the root node defining the broadest class or entity) need only have linkage via a parent link 308 to a single parent node 304 and a link to a sense node 306 defining the sense of the word. It should also be appreciated that the word "pencil" would have an additional word signatures, such as word signature 300b, in CMF graph 208 for its verb and adjective meanings.

As a further convenience, CMF graph 208 may optionally further include a word root node 320 for each collection of multiple word signatures 300a,300b sharing map links 312 to a common word spelling in words map 206. Word root node 320, which is connected to the common word in words map 206 by its own map link 312, is connected to the meaning node 302 of each word signature 300a, 300b in the collection by a respective root link 314. With this structure, ANLP 110 can easily traverse 208 between any of words map 206 and the various word signature(s) 300 associated with a word spelling.

It should also be noted that in some embodiments, word endings may conveniently be stored in CFM graph 208 in the same manner as a word and its meanings. For example, the ending "-ian" could be stored with a parent node of "word ending" and a sense node of "relates to". Similarly, "-tion" could be stored with a parent node of "word ending" and with a sense node of "process".

Figure 4:
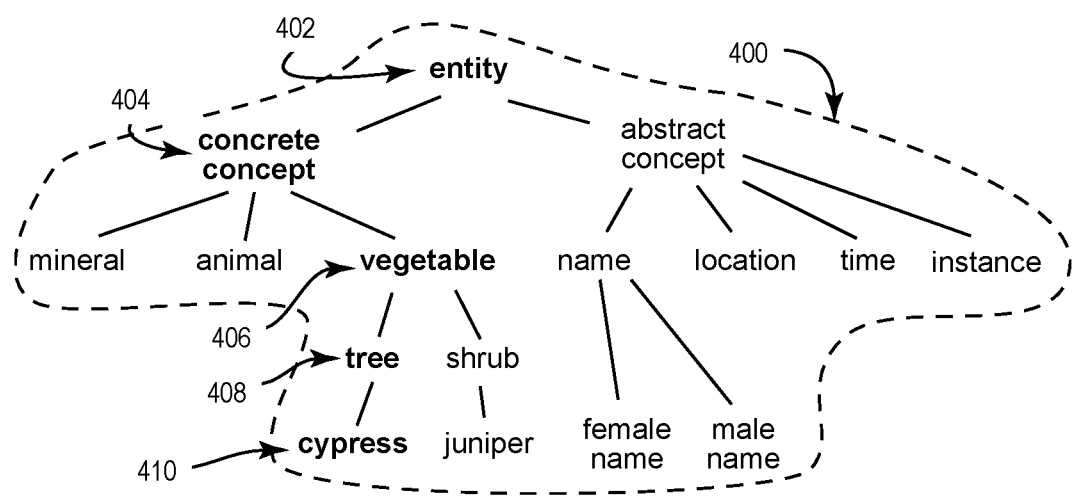
FIG. 4 depicts a portion of an exemplary CMF graph in which multiple meaning signatures form a tree-like structure.

Referring now to FIG. 4, there is depicted one embodiment of a portion of an exemplary CMF graph 400 in which multiple meaning signatures form a tree-like structure. To prevent obscuring the tree-like structure, sense nodes are omitted from the illustration.

In this example, CMF graph 400 has a meaning node 402 at the root of the hierarchy having the default meaning of "entity". Coupled to root meaning node 402 by parent links are multiple additional meaning nodes storing more specific meanings. For example, meaning node 404 stores the meaning "concrete concept," which defines a class containing the more specific meaning "vegetable" stored in meaning node 406. Meaning node 406 in turn forms the parent node of meaning node 408, which stores the yet more specific meaning "tree". Meaning node 408 in turn serves as the parent node of meaning node 410, which stores the name of a subclass of trees, namely, "cypress". Classes such as those illustrated may be further particularized by meaning nodes representing specific instances, such as the name of an animal, such as "Fido". The inclusion of instance names within a CMF graph is illustrated in FIG. 5.

Figure 5:
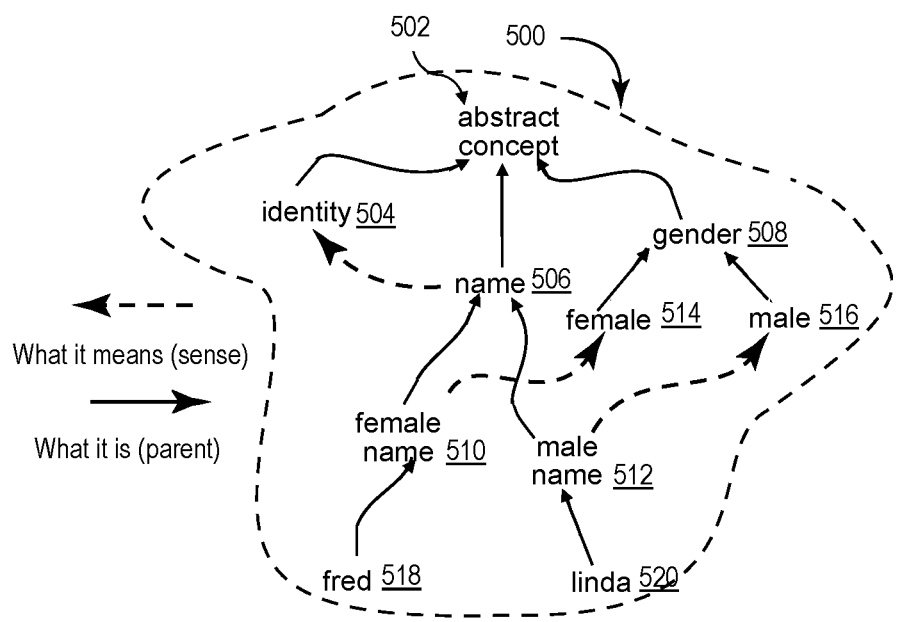
FIG. 5 illustrates a portion of another exemplary CMF graph which shows parent (what-it-means) links and sense (what-it-refers-to) links between meaning nodes.

With reference now to FIG. 5, there is depicted a portion of another exemplary CMF graph 500. In FIG. 5, parent (what-it-is) links are depicted with solid lines and sense (what-it-refers-to) links are depicted by dashed lines.

Within CMF graph 500, three subclasses of the "abstract concept" class defined by meaning node 502 are defined by node 504 ("identity"), node 506 ("name"), and node 508 ("gender"). Node 506 has two child nodes defining subclasses of "name", namely, node 510 ("female name") and node 512 ("male name"). Nodes 510 and 512, while sharing the same parent node 506, have sense links to different sense nodes, namely, node 514 ("female") and node 516 ("male"), respectively. It should be noted that nodes 514 and 516, in addition to serving as sense nodes, also serve as meaning nodes that share a common parent node 508 ("gender"). Similarly, node 506 ("name") has as a parent (what-it-is) link to node 502 ("abstract concept") and a sense link to node 504 ("identity), which also serves as both a sense node and a meaning node. While some of the remaining nodes in CMF graph 500 do not have sense links explicitly illustrated for visual clarity, it should be understood that every graph node under the root meaning node 502 has a sense link in addition to its parent link.

FIG. 5 additionally illustrates that a CMF graph 500 can include instance names of particular instances of classes. For example, node 518 ("fred") and node 520 ("linda") are instances (specific examples) of a female name and a male name, respectively. The fact that nodes 518 and 520 hold instance names can be recorded as a type within the edge connections (e.g., the associated parent links 308 and/or sense links 310) and/or within nodes 518 and 520.

It should also be appreciated that the CMF graphs employed herein may include one or more types of nodes in addition to the three described above (i.e., parent nodes, meaning nodes and sense nodes). For example, additional node types can be defined for location, time, placement, condition and the like.

In some cases, a need arises to remove nodes from a CMF graph. For example, one or more nodes may need to be removed to reclaim memory space, to eliminate nodes that are no longer relevant, or for some other cause. Implementation of ANLP 110 in a reference-based language such as Java, Scala or C#, or reference-counting systems such as C++'s boost system, make node removal relatively easy. All references to nodes that are to be removed can be discovered by suitable heuristics and then set to null or to zero. When all references to the nodes to be trimmed are marked, a garbage collector function (which may be integral to the operating system or other operating environment software 109) reclaims memory allocated to the nodes.

Referring now to FIG. 6, there is depicted a summary of exemplary word signatures for the word "about". In this example, the word spelling "about" has eight word signatures, each having its own respective meaning node identifying the term "about" and all sharing a common parent node identifying the class "preposition". As indicated, each word signature additionally includes a sense node indicating which of eight potential meanings of "about" is intended, namely, (1) location, (2) approximation, (3) associated with, (4) around, (5) time, (6) epoch, (7) measurement, or (8) quantity. As discussed further below, one or more constraints can be utilized to capture the exact intended meaning in context. If the meaning is not resolved in an automated fashion through the use of constraints, for clarification, ANLP 110 can inquire of a user or administrator, "For 'about', is 'location', 'approximation' or 'associated with' meant?", where the presented meanings are selected by ANLP 110 based, for example, on a relative scoring of the meanings. If the user's or administrator's response is "None of those", ANLP 110 can continue prompting the user/administrator using others of the possible meanings.

With reference now to FIG. 7, there is illustrated a summary of exemplary word signatures of a variety of related words having a variety of parents. In FIG. 7, it can be observed that each parent node of a meaning node provides another meaning. For example, for the first meaning of the term "period", the parent node provides the meaning "time (duration)", which provides a convenient notational semantic that quickly conveys to both human and machine what specific meaning of "time" is intended. The associated sense node indicates "time per cycle", which is chosen to indicate to a human reader (as well as to ANLP 110) which sense of the meaning is intended. FIG. 7 also illustrates that different meaning nodes can share the same parent node and/or the same sense node. For example, one of the meaning nodes for "epoch" and one of the meaning nodes for "eon" share a common parent node ("period (epoch)") as well as a common sense node ("time period").

If ANLP 110 encounters a new word meaning that is to be remembered but is initially unknown, ANLP 110 designates, as a parent node of the new meaning node, a default parent node, such as "thing" or "entity". In addition, ANLP 110 associates the new meaning node with a default sense node, having the value "unknown word". ANLP 110 (or AI system 230) can then utilize one or more subsequently encountered definitions of the word meaning to update the parent and sense links to redefine and/or refine the previously unknown meaning.

Figure 8:
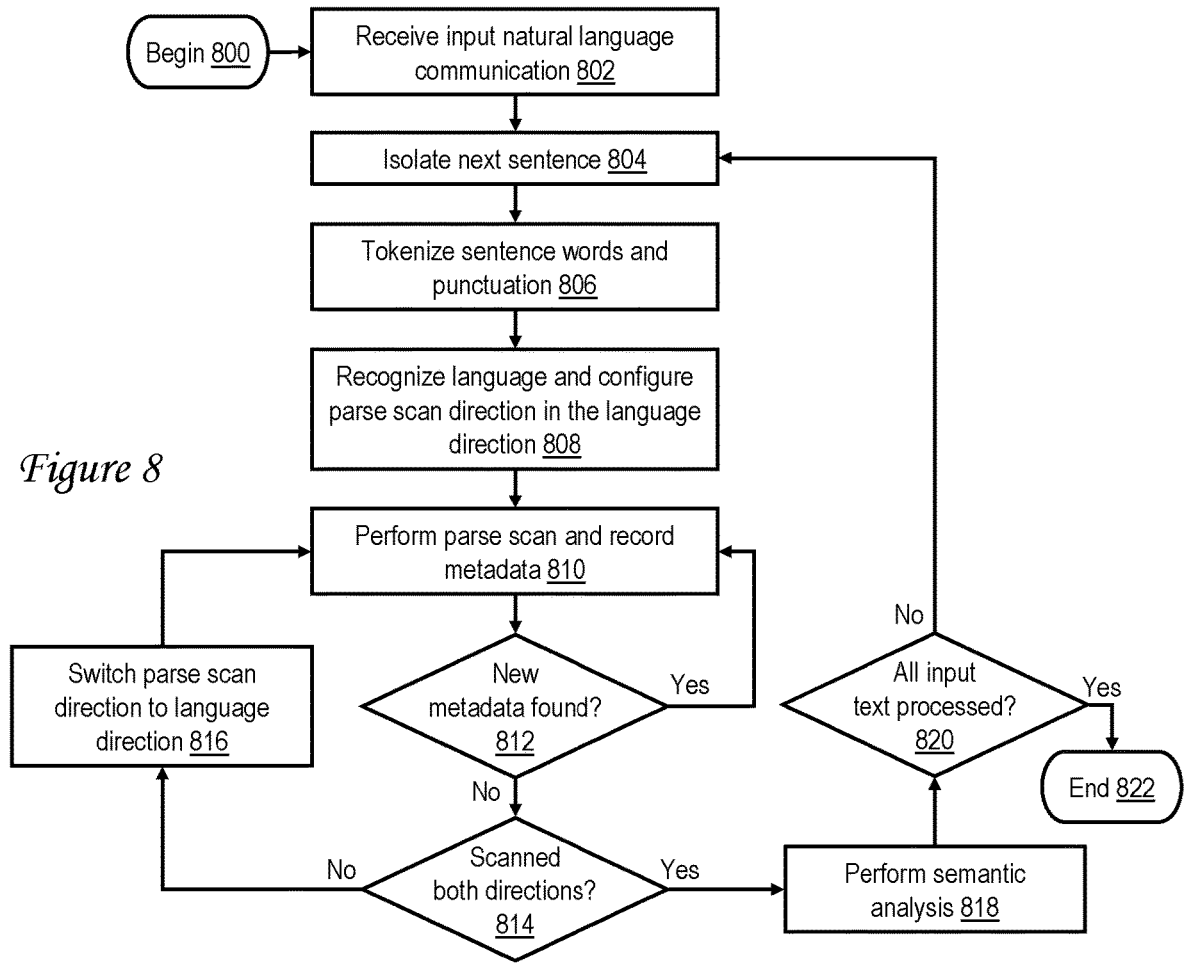
FIG. 8 is a high level logical flowchart of an exemplary embodiment of a process for processing a sentence or sentence fragment utilizing an ANLP as described herein.

FIG. 8 is a high level logical flowchart of an exemplary embodiment of a process for processing a sentence or sentence fragment utilizing an ANLP 110 as described herein. As with the other flowcharts presented herein, the steps of FIG. 8 are presented in a logical rather than strictly chronological order, meaning that in some alternative implementations the functions represented by the blocks may be performed substantially concurrently or in a different order than presented.

The process begins at block 800 and then proceeds to block 802, which illustrates ANLP 110 receiving as input from natural language communication sources 210 natural (human) language communication. In response to receipt of the input natural language communication, sentence isolator 200 isolates from the input text at least a next sentence or sentence fragment to be processed. In some implementations, sentence isolator 200 may decompose the entirety of a natural language communication (e.g., news article, email, web page, speech, etc.) into sentences and sentence fragments at block 804. In other implementations, sentence isolator 200 may instead simply isolate a next sentence or sentence fragment to be processed.

At block 806, tokenizer 202 tokenizes each word and punctuation mark within the sentence or sentence fragment. For example, consider the exemplary sentence:

Over the past weekend, rumors began to emerge that the Syrian opposition would allow elements of the al Assad regime to remain in Syria and participate in the new government.

Figures 9, 10:
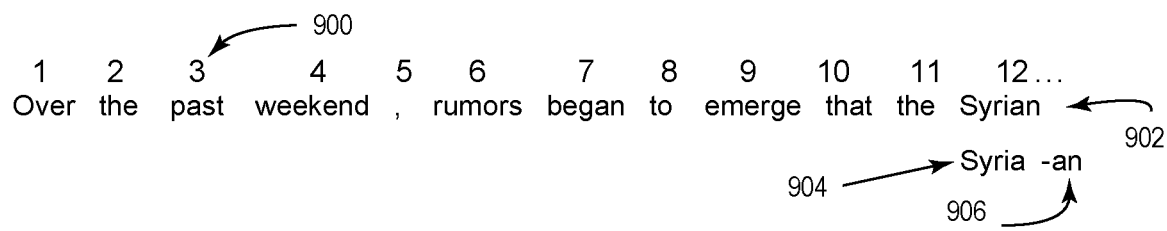
FIG. 9 illustrates an exemplary sentence of natural language text as tokenized by an ANLP in accordance with one embodiment.
FIG. 10 depicts an exemplary token storage area for a token of sentence or sentence fragment in accordance with one embodiment.

As shown in FIG. 9, tokenizer 202 tokenizes the exemplary sentence by sequentially assigning each of the words and punctuation marks within the sentence a sequential token number 900 according to sentence position. In addition, tokenizer 202 preferably allocates for each token a respective token storage area 114 (see FIG. 1) and, if the token is associated with a word (as opposed to punctuation), looks up the word (e.g., both root form (a "lemma") and root-with-ending forms) in words map 206. For example, for token 902, tokenizer 202 would look up in words map 206 both the words-with-ending form "Syrian" and the root form "Syria." As noted in FIG. 1, the allocated storage areas 114 are preferably linked in sequence (e.g., by pointers) to form a token list 116.

FIG. 10 depicts an exemplary data structure for organization of token storage area 114 allocated by tokenizer 202. In this embodiment, a token storage area 114 includes a token field 1000 that stores the relevant word or punctuation mark in natural language textual format. Token field 1000 is associated by the data structure with a token metadata field 1002, that stores metadata learned about and associated with the token specified in token field 1002. The token metadata stored within token metadata field 1002 can include, for example, the root form of the token, one or more pointers to an entry or entries in words map 206 for the word-with-ending and/or root form of the token, part of speech, and capitalization information, if any. Advantageously, by storing pointers, no further text string comparisons need be performed during processing by ANLP 110; instead, simple string-pointer comparisons can be used in place of full-length string comparisons. (All references to a given text word use the same map 206 address.)

In addition, token storage area 114 contains storage semantic information related to the token. In a preferred embodiment, the semantic information of token storage area 114 is formatted in two lists, one for each side of the token. Each list includes a semantic data type and a token span distance. Thus, for storing information about semantic structure(s) including the token and optionally one or more tokens to the right, token storage area 114 includes right semantic data type (SDT) fields 1006a-1006m for storing an identification of the semantic structures and associated right span fields 1004a-1004m indicating a span (in number of tokens) of the semantic structure such as a prepositional phrase. Similarly, for storing information about semantic structure(s) including the token and optionally one or more tokens to the left, token storage area 114 includes left SDT fields 1008a-1008n for storing an identification of the semantic structures and associated left span fields 1010a-1010n indicating a span (in number of tokens) of the semantic structure. For convenience, the spans specified in right and left span fields 1004 and 1010 may include the token itself.

The semantic information recorded in token storage area 114 enables rapid right-to-left and left-to-right constraint matching as described below. The richer the set of semantic structures identified and recorded during the earlier semantic scans, the more able subsequent scans are able to make complex assessments of higher level semantic structures.

Returning to FIG. 8, the process proceeds from block 806 to block 808, which depicts parser 204 recognizing the natural human language of the sentence or sentence fragment. In some embodiments, parser 204 can recognize the natural human language directly from information provided by natural language communication source(s) 210. In other embodiments, parser 204 recognizes the natural human language based on the most predominate of the natural human language(s) specified in words map 206 for the words looked up by tokenizer 202. As will be appreciated, each written natural human language inherently employs a textual direction. For example, English and many other natural human languages are understood to move from left to right at both a word and sentence level. Other natural human languages such as Hebrew and Arabic, in contrast, move from right to left. At block 808, parser 204 configures an initial parse scan direction in the textual direction of the natural human language of the sentence or sentence fragment. Thus, for English language text, the initial parse scan direction is set to scan rightward.

Following block 808, the process proceeds to blocks 810, which depicts parser 204 performing a low-level parse scan across all tokens within the sentence or sentence fragment in the presently configured scan direction. In performing the parse scan, parser 204 processes each token or group of tokens sequentially until all metadata that can then be generated for the token(s) are determined and stored within the associated token storage area 114. Parser 204 then processes the next token(s) in the sentence or sentence fragment until the end of the sequence of tokens is reached. As indicated at block 812, parser 204 repeats this process recursively until no new metadata are generated for the sentence or sentence fragment in the presently configured scan direction. The metadata generated by parser 204 can include low-level information, such as parts of speech, idiomatic semantics (e.g., multi-word verbs or nouns, idioms, etc.), phrasal structures (e.g., noun phrases, prepositional phrases, infinitive phrases, etc.) and meta structures (e.g., identification, time, location, social groupings, topic, media, etc.).

At block 814, parser 204 determines whether or not it has performed a parse scan of the tokens comprising the sentence or sentence fragment in both directions. If not, parser 204 switches the parse scan direction from left-to-right to right-to-left or vice versa (block 816) and repeats blocks 810-812. However, in response to a determination at block 814 that parser 204 has performed a low-level parse scan of the sentence or sentence fragment in both directions, the process passes to block 818, which depicts semantic analyzer 214 performing semantic analysis of the sentence or sentence fragment to obtain mid-level and high-level content from the sentence or sentence fragment.

Thereafter, ANLP 110 determines at block 820 whether or not additional input communication from natural language communication source(s) 210 remains to be processed. In response to a determination that all input natural language communication has not yet been processed, the process of FIG. 8 returns to block 804, which has been described. However, in response to a determination at block 820 that all input natural language has been processed, the process of FIG. 8 ends at block 822.

Figure 11:
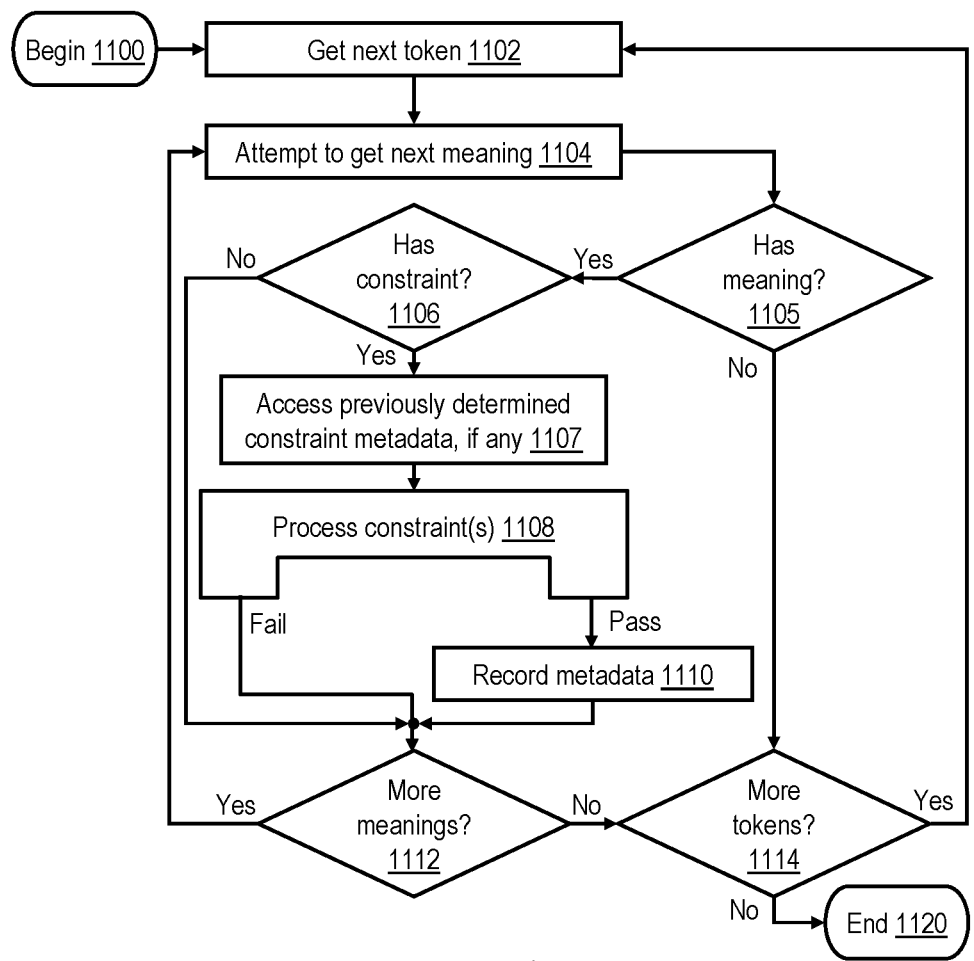
FIG. 11 is a high level logical flowchart of an exemplary process for performing a parse scan of a sentence or sentence fragment utilizing an ANLP in accordance with one embodiment.

With reference now to FIG. 11, there is illustrated a high level logical flowchart of an exemplary method of performing a low level parse scan as depicted at block 810 of FIG. 8. The parse scan process of FIG. 11 begins at block 1100 and then proceeds to 1102, which illustrates parser 204 getting a next token, that is, accessing the token storage area 114 for the next token in the token sequence to be processed in the presently configured parse scan direction. At block 1104, parser 204 then attempts to access the next possible meaning of the token from a meaning signature 300 in CMF graph 208 utilizing the pointer(s) previously stored in token storage area 114 by tokenizer 202. In some cases, a token may have only one possible meaning; in others, the token may have multiple meanings, among which ANLP 110 can select using, for example, constraints, the parent and/or sense links, and/or class memberships of the proposed meaning. Of course, it may sometimes be the case that CMF graph 208 does not contain any possible meaning for the word, for example, if ANLP 110 has not encountered the word before. If parser 204 determines at block 1105 that the CMF graph 208 does not contain any meaning for the term, no processing of the meaning of the word is presently possible, and the process consequently passes to block 1114, which is described below. However, in response to parser 204 determining at block 1105 that CMF graph 208 contains at least one meaning for the token, the process passes to block 1106.

Block 1106 depicts parser 204 determining whether or not the meaning node of the meaning signature of the currently selected meaning of the current token contains a constraint applicable for the current parse scan direction. If not, the process passes to block 1112, which is described below. However, in response to a determination at block 1106 that the currently selected meaning of the current token has a constraint applicable to the current parse scan direction, parser 204 accesses metadata previously generated from processing the token, if any, from the token storage area 114 of the current token (block 1107). In this way, parser 204 need not re-discover previously determined metadata regarding the token. Parser 204 then processes the constraint from the meaning node in CMF graph 208 (block 1108). As noted above, in a preferred embodiment, processing the constraint includes parser 204 invoking execution of one or more constraint handlers 212 to attempt to match the constraint at the current context.

Figure 12:
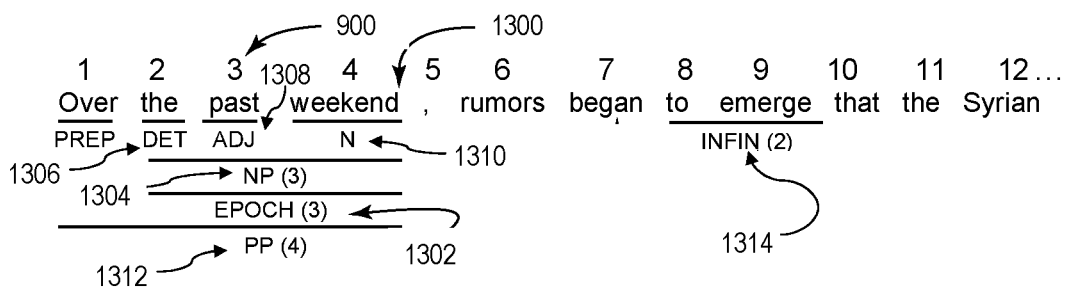
FIG. 12 depicts an exemplary set of constraints associated with one of the tokens in the exemplary sentence of FIG. 9.

For example, FIG. 12 provides a table 1200 summarizing a portion of an exemplary CMF graph 208 relating the first token "over" within the exemplary sentence given above. In this example, CMF graph 208 includes three meaning signatures for "over," respectively having sense nodes specifying "time," "location" and "old". As indicated, the common parent node for the meaning nodes having the sense of "time" and "location" is "preposition", and the parent node for the meaning node having the sense of "old" is "idiom". These three meanings respectively have the associated constraints EPOCH, LOC (i.e., location), and the idiomatic phrase "over the hill", which can conveniently be stored in the relevant meaning nodes. Thus, when one of these three meaning signatures for "over" is accessed at block 1104 of FIG. 11, the associated constraint is processed at block 1108 through the invocation of one or more constraint handlers 212. In one embodiment, parser 204 processes tokens having multiple constrained meanings starting with the longest constraints first.

Returning to FIG. 11, when parser 204 processes the constraint(s) of the currently selected meaning of the currently selected token at block 1108, two outcomes are possible. If processing of the constraint indicates that the sentence or sentence fragment matches (satisfies) the constraint at the current token in the currently configured parse scan direction, then parser 204 determines that the constraint processing passes. Alternatively, in the absence of determining such a match, parser 204 determines that the constraint processing fails. Constraint processing as shown at block 1108 is described in greater detail below with reference to FIGS. 15-16. When one (or more) constraint is satisfied for a word token, one specific meaning out of all of the associated word's meanings within the CMF graph 208 is determined (and implicitly, the part of speech and the associated parent and sense connections) and is recorded in the token metadata field 1002, as shown at block 1110.

If at least one meaning constraint exists but was not satisfied, the intended meaning for the word is not determined by the constraint, but may be disambiguated by a subsequent iteration of the parse scan. In the case that a constraint is not satisfied, ANLP 110 may alternatively or additionally attempt to resolve this ambiguity, for example, by examining parent and sense connections, directly querying a user or administrator what was, or was the likely intended meaning or by making a heuristics-based meaning selection based, for example, on prior usage of either meanings or words and/or the parent and/or sense links and/or class memberships of the extant meanings in CMF graph 208.

Following block 1108 (in the case constraint processing failed) or block 1110 (in the case constraint processing passed), the process of FIG. 11 proceeds to block 1112, which depicts parser 204 determining whether or not any additional possible meanings of the current token remain to be processed. If so, the process returns to block 1104, which is described above. If, however, parser 204 determines at block 1112 that all possible meanings of the current token have been processed, the process proceeds to block 1114. Block 1114 depicts parser 204 determining whether or not any more tokens of the sentence or sentence fragment remain to be processed in the current parse scan direction. If so, the process returns to block 1102, which as described above, illustrates getting the next token. In general, the next token is the token immediately following the longest span of those meaning constraints matched from the current token position. If, however, parser 204 determines at block 1114 that all tokens of the sentence or sentence fragment have been processed in the current parse scan, the parse scan process of FIG. 11 terminates at block 1120.

It should be noted that in processing the constraints as illustrated at block 1108 of FIG. 11, the constraints of tokens may relate to a multi-word phrases. For example, as shown in FIG. 12, the meaning node for "over" may contain a constraint "over the hill", which is defined to be an idiom by its parent connection. If this constraint is satisfied, parser 204 advances its parse index past idiom's final word based on the detected span recorded in the word's token storage area 114. Similarly, one meaning node of the word "seat" may contain a noun phrase constraint or compound noun constraint for a multi-word unit such as "seat belt". If this constraint is satisfied, parser 204 advances its parse beyond the second word in accordance with the detected span recorded in the word's token storage area 114. In both cases, parser 204 records all discovered metadata in token storage area 114. It should be noted that by using constraint matching to construe multi-word phrases in this manner, parser 204 can perform some lower level semantic analysis.

Figure 13:
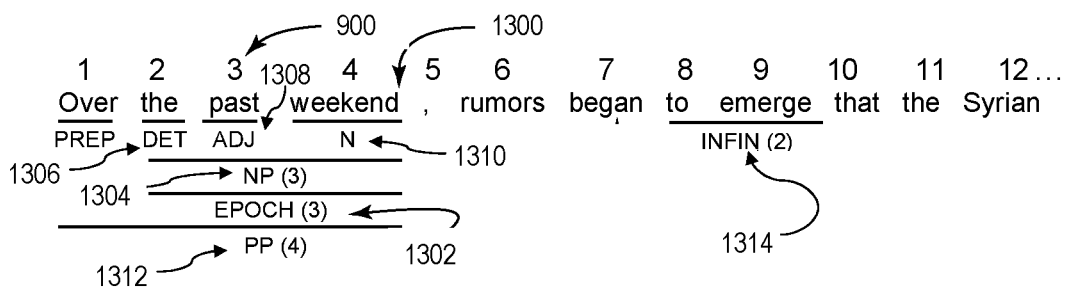
FIG. 13 depicts the application of constraints to the exemplary sentence of FIG. 9 in accordance with one embodiment.

In some cases, constraints may also be nested. For example, FIG. 13 depicts that on a parse scan in accordance with FIG. 11, parser 204 begins to process the constraints for token 4 for the word "weekend" as indicated at reference numeral 1300. As noted in FIG. 13, one meaning of the token "weekend" satisfies four associated constraints, including N (Noun), NP (Noun Phrase), EPOCH, and PP (prepositional phrase). In this case, some but not all of these constraints are nested. For example, the EPOCH constraint 1302 may reference a NP constraint 1304 related to time. NP constraint 1304 may in turn reference further constraints, including DET constraint 1306, ADJ constraint 1308 and N constraint 1310. As each nested constraint is encountered, parser 204 attempts to extend the extent of the match to the greatest span possible, which is three tokens ("the past weekend") in the case of EPOCH constraint 1302. Thus, in attempting to match EPOCH constraint 1302, parser 204 has matched and recorded linguistic metadata for three tokens, each able to match some other constraint in the process. Specifically, the by-products of constraint matching identified a DET ("the"), ADJ ("past") and NOUN ("weekend"). For each constraint match, the span of tokens matched by the constraint is saved at block 1110 and can possibly be utilized during a later parse scan in the same or opposite direction. For example, a subsequent parse scan will identify tokens 2-4 as satisfying a PP (Prepositional Phrase) constraint 1312 of token 1 ("over"), resulting in a match spanning four tokens.

FIG. 13 further illustrates that constraint matching during parsing can also permit parser 204 to recognize phrasal structures, metadata structures and clausal structures. For example, one meaning of token 7 ("began") has an associated INFIN (Infinitive) right constraint 1314, which matches the infinitive verb phrases "to emerge" spanning tokens 8-9. Parser 204 accordingly records a span of two in association with this constraint in the relevant token storage area 114 of token 8.

Referring now to FIG. 14, there is depicted one example of how the semantic information determined during constraint processing can be recorded within a token storage area 114 configured in accordance with FIG. 10. In this example, the fourth token of the exemplary sentence (viz. "weekend") is stored in token field 1000 and associated token metadata is stored in token metadata field 1002.

The semantic information stored in token storage area 114 includes the semantic data type N (representing the match of a Noun constraint) recorded into right semantic data type (SDT) field 1306*a*. The associated right span field 1304*a* stores a right span of 1, indicating the N semantic data type includes only the token itself. The semantic information recorded within token storage area 114 further includes the four left semantic data types specified in left SDT fields 1008*a*-1008*d* and having the respective token spans indicated by left span fields 1010*a*-1010*d*. In this example, the left SDTs associated with the token "weekend" include a N having a left span of 1 (indicating the N SDT includes only the token itself), the NP (Noun Phrase) SDT having a left span of 3, the EPOCH SDT also having a left span of 3, and the PP (Prepositional Phrase) SDT having a left span of 4.

In general, SDTs discovered by the matching of a constraint spanning a single token is stored in the token storage area 114 of that token. If the constraint matches a multi-word token sequence, the SDT (and the associated span) is recorded in the token storage area 114 of the first token of the multi-word token sequence. Conveniently, the SDT (and the associated span) is preferably also recorded in the token storage area 114 of the last token of the multi-word sequence in order to facilitate parse scan matching in the opposite parse scan direction.

The design and use of constraints as disclosed herein provides a powerful technique for narrowing the range of possible meanings of words to specific meanings. In a preferred embodiment, constraints are only required for structural words such as prepositions, conjunctions and verbs and are optional for nouns, pronouns, adjectives and adverbs, as these parts of speech can usually be disambiguated using their parent and/or sense connections alone. When a word meaning possesses a constraint, that word meaning is not a possible meaning of the word unless the constraint matches the context of the token in the sentence or sentence fragment. In general, most word meanings having a constraint will have only a single constraint; a relative few will have multiple alternative constraints. In general, nouns that are "fundamental concepts" in human society will generally have a constraint on them. Examples of these are time, duration, location, social group, familial relations and the like. These fundamental concepts comprise perhaps only 0.5-1% of the word vocabulary. Ease of constraint processing is facilitated by the underlying structure of the CFM graph.

For words having no constraints defined for them, unambiguous parsing is normally possible by processing the constraints of the surrounding words. In cases in which a word meaning cannot be determined at the current iteration pass, it can almost always be identified at later pass(es). For example, during subsequent passes, an enclosing structure (such as the predicate) often positively identifies the only realistic meaning (and part of speech) of these previously unparsed words. Alternatively or additionally, parser 204 can attempt to disambiguate the meaning of an unconstrained word by reference to its parent and sense nodes. In this manner, each successive parse scan over a sentence or sentence fragment finds additional "parts of the puzzle."

Recursive parse scanning as described also enables discovery of metadata describing word tokens having a constraint, but for which no constraint can be matched to the current sentence context. In such cases, parser 204 initially records that the word token has an unknown meaning in token metadata field 1002 of the token. Parser 204 thereafter continues to seek to find a constraint match including the token when processing constraints related to higher-level semantic structures. For example, if token 6 of the exemplary sentence (i.e., "rumor") lacks a constraint, parser 204 will mark the token as having an unknown meaning during its initial parse scan. Subsequent parse scans will likely recognize "rumor" as part of a likely sentence subject. Parser 204 can then update token metadata 1002 of the token to identify the token as belonging to a noun suitable for use in a sentence subject. Parser 204 may alternatively or additionally throw an exception to inquire of a user, communicant (or system administrator) regarding the likely meaning of the token in context.

In the embodiments described herein, each type of constraint is referenced by a mnemonic, typically an enumeration, which can be freely intermixed with natural language text within the constraint. For example, one specific meaning of "is" indicates an action when linked with a gerund. That meaning's constraint might could take the form of: "is GER". This constraint would then match a variety of gerundive phrases, such as "is fishing" or "is lightly sleeping". As another example, consider the meaning of "about" (a preposition) in the sense of "approximate time". The associated constraint might take the form of "about TIME". This constraint would match such diverse phrases as: "about 3 o'clock" or "about the time of Jenny's return" or "about the turn of the century". (These constraint forms normally make recursive use of constraints, as discussed previously and below.)

An exemplary non-exhaustive list of constraint mnemonics is given below in Table 2. In Table 2, the Meaning column gives a succinct explanation of the mnemonic, and the Notes column provides an explanation of and/or example(s) of words which might match the constraint.

| Mnemonic | Meaning | Notes |
| --- | --- | --- |
| DET | Determiner | Any (bare) determiner, Such as "a", "an", "the", "those" |
| DIMIN | Diminutive | A comparative, such as, "least", "lowest", "below average" |
| DIST | Distance | A measure of distance, such as "3 miles" |
| DUR | Duration | A measure of time in definite units, such as "day", "week", "month", "year", "century", "20 seconds", "eon" |
| GER | Gerund | An "-ing": form of a verb, such as "doing", "walking", etc. |
| IC | Independent clause | Can be a stand-alone sentence w/minimum of a verb and implied subject |
| MON | Month | Any valid calendar month |
| N | Noun | Any (bare) noun |
| N_NCNT | Non-countable Noun | Non-countable concrete noun, such as, "liquid", "sand", "powder", "grain", "air" |
| NP | Noun phrase | Contains noun w/optional determiner & adjectives. Can include an optional DET, zero or more ADJs (or other Ns) and a Noun. May or may not include a suffixed prep phrases. It is thus possible to have both NP match options occur in the same sentence, an NP without a PP and a NP with one or more PPs appended. Example: "a fun walk in the local park," where "walk" is the noun. |
| NP_PATH | Noun of path | A NP that connotes a placement of a continuous object such as a road, treeline, path, fence. NP_PATH shows membership of an object in the shape class. Examples: "shoreline", "outline", "path" |
| NP_QTY | NP of quantity | A NP of quantity that expresses explicit amounts with units of measure (e.g., dollars, feet, or gallons) or arbitrary nouns, (e.g., 29 buffalo). Example: "sales of $100,000". |
| PN | Pronoun | Examples: "he", "she", "it", "them", "they", "him", "her" |
| PP | Prep phrase | A prepositional phrase. Examples: "in the dark", "over the hill", "on time". It may be a simple PP or compound PP such as "in the park by the woods past the bend". |
| PRP | Preposition | Any (bare) preposition, e.g., "in", "on", "about", "over", "at". Example, "in the weeds". Multiple PPs may exist in sequence, but PRPs are each matched individually, not as a set. |
| PRES_PART | Present participle | An "-ing" form of verb. Example: "currently happening" |

-continued

| Mnemonic | Meaning | Notes |
| --- | --- | --- |
| QNTFY | Indefinite quantify | Specifies an indefinite or approximate quantity. Examples: "about enough", "approximately correct", "possibly low", "about right" |
| QTY | Quantity | A quantity ending in a unit of measure. Example: "3 miles" |
| RANK | Rank of position | Reflects noun membership in a class of rank or position. Examples: "GM", "president", "vice president", "priest" |

In one embodiment, each mnemonic has a corresponding constraint handler 212 that, when invoked, attempts to match the constraint to the current context of the sentence or sentence fragment (where the context refers to a span of tokens including the token currently being processed). For example, if 78 classes of constraints are defined, there will be one (custom) constraint handler for each of the classes of enumerated constraints. A constraint handler 212 may use one or more heuristics to perform the match, and such heuristics may vary between constraint handlers 212. According to one such heuristic, the constraint handler 212 determines if the current word meaning makes sense in the current sentence context.

For example, the constraint handler 212 for the DUR (duration) constraint may determine if the meaning signature of a word indicates that the word is a member of a "duration" class. (Such membership can be determined by reference to CMF graph 208, whether as originally configured or as updated by subsequent training.) In such a case, the word "day" would be a member of a "duration" class, while "yesterday" would not. Thus, if the current context of the sentence included the token "day", then the constraint handler 212 (and hence parser 204) would determine a match for the DUR constraint.

Similarly, the constraint handler 212 corresponding to the EPOCH constraint would find a match any of the following valid forms: "at two o'clock", "near 2:00", "when your aunt Mary arrives", "6000 BC", "the turn of the century", "in 153 nanoseconds", "today after Mom gets home", "tomorrow", "last year", "at 21:29:00 GMT", "next Monday at 9:15", "soon".

As noted above, some constraints may advantageously be nested, meaning that the constraint handlers 212 for some higher-level constraints may in turn call the constraint handler 212 of one or more lower level constraints. For example, the Noun Phrase (NP) handler is implicitly tasked with identifying all sub-components composing a noun phrase. As such, the constraint handler 212 for the NP constraint can invoke one or more additional constraint handlers 212 to do its work. Consider the noun phrase, "an orange-rust oil tanker". An exemplary embodiment for the NP constraint handler might use the following pseudo-code:

Match optional DET ("an").
Match multiple optional ADJ ("orange-rust");
Match multiple optional N or noun equivalents ("oil tanker").
Require at least one N, to end the NP ("tanker").

In this way, the code that matches a lower level constraint such as ADJ (i.e., the ADJ constraint handler), for example, need only be implemented once, yet can be referenced by multiple higher level constraint handlers 212.

It should also be noted that when a match is found at a lower level of constraint matching, any match found at the lower level is valid, recorded in the relevant token storage area(s) 114, and usable by other constraint handlers without re-discovery, regardless of whether or not the upper level constraint handler invoking the lower level constraint handler fails to find a match. As noted above with reference to block 1107 of FIG. 7, to utilize the previously recorded metadata, parser 204 determines whether the token at the current parse scan index has already been matched. For example, returning to the example given in FIG. 13, the tokens corresponding to "over the past weekend" are readily identified as belonging to their respective parts of speech by PREP, DET, ADJ and N constraints. During subsequent processing of a PP constraint for the token "over", the associated PP constraint handler quickly determines a match by inspecting the four parts of speech specified in the recorded metadata. The PP constraint handler need not to re-discover those parts of speech again. It should also be noted that previously generated constraint metadata can be reused to determine subsequent matches, regardless of scan direction.

Like the NP constraint handler discussed above, to implement constraint matching, the EPOCH constraint handler may invoke constraint handlers for other constraints such as a DAY constraint handler and/or DATE constraint handler, which recognize a day or date, respectively. To match a day or date, the constraint handlers may also look at a word signature's parent node (i.e., the meaning's class), and/or the sense node, and/or yet other heuristics. Further, the EPOCH constraint handler may call constraint handlers for other constraints such as TIME, IC (independent clause) and other constraints, even recursively. As one example, the constraint handler for the EPOCH constraint might attempt to match an entry in a sequential list, as reflected in the following pseudo-code:

```
if Match ("at TIME") return pass;         // e.g., "at two o'clock" or "at 21:29:00 GMT"
if Match ("near TIME") return pass;       // e.g., "near 2:00"
if Match ("when IC") return pass;         // e.g., "when your aunt Mary arrives"
if Match ("DATE") return pass;            // e.g., "6000 BC"
if Match ("TIME_IDIOM") return pass;      // e.g., "the turn of the century" or "soon"
if Match ("in DURATION") return pass;     // e.g., "in 153 nanoseconds"
if Match ("EPOCH after IC") return pass;  // e.g., "today after Mom gets home"
if Match ("RELATIVE_DAY") return pass;    // e.g., "tomorrow"
if Match ("RELATIVE_YEAR") return pass;   // e.g., "last year"
if Match ("next DAY at TIME") return pass; // e.g., "next Monday at 9:15"
else return fail;
```

Other constraint handlers may be implemented similarly. For example, the PP (Prepositional Phrase) constraint handler may be implemented utilizing the following pseudo-code:

| | |
|---|---|
| if not Parent("preposition") return fail; | // e.g., "by", "about", "when", "In", etc. |
| if not Match ("PREP") return fail; | // e.g., "by", "about", "when", "In", etc. |
| if Match ("NP") return true; | // e.g. , "violent wind", "peaches", "David" |
| else return fail; | |

The foregoing pseudo-code demonstrates two methods of verifying that the current token is a preposition. The PP constraint handler may search the parental chain of nodes in CFM graph 208 (i.e., along the parent links) to determine if one has the meaning "preposition", as shown in the first line. Alternatively or additionally, the PP constraint handler may directly match the token to an enumeration of known prepositions via the Match ("PREP") command given in the second line; for a properly constructed CFM graph 208 and constraint handler, these commands should return equivalent results.

In at least some embodiments, when constraint handlers 212 are determining the presence of a match at a particular sentence context, constraint handlers 212 determine the match using the root word (if known), as well as the word-with-ending. "Standing" and "stand" is an example of this. Both spellings contain one or more independent meanings each in its own right. "Standing" could be a noun while "stand" might be a verb or a noun. Example meanings include: standing within the organization, standing on the platform, the fruit stand, cannot stand, or stand in the corner.

To support code reuse and more compact code implementations, constraint handlers 212 may also implement a common set of constraint handler functions. A non-exhaustive list can include those set forth below in Table 3.

TABLE 3

| Constraint handler function | Use |
|---|---|
| Match(Constraint) | Determines a match if any of the meanings of the current token matches the specified constraint in a possibly recursive fashion, e.g., Match(VERB), where VERB is a constraint that identifies verbs |
| Parent(Meaning) | Determines a match if the token has the indicated parent meaning within its parent hierarchy, e.g., Parent("time(duration)") |
| Sense(Word) | Determines a match if any meaning of the current token has the indicated sense connection, e.g., Sense("duration"). |
| Member(Class) | Determines a match if any meaning of the current token has membership in the indicated class. For example, Member("fireman (profession)") will find a match for "Thomas", if "Thomas" is a member of the fireman profession. |
| Word(Word) | Determines a match if any meaning signature of the current token has the specified word in its meaning node or in a higher level parent node. E.g., Word("bluefish") |

One skilled in the art will realize that many other graph-based constraint handler functions can be defined. Each makes use of the node and edge relationships in CFM graph 208 to determine if any meaning matches the indicated constraint relationship. This methodology thus also permits matching against any graph characteristic, even against graph isomorphisms.

Figure 15:
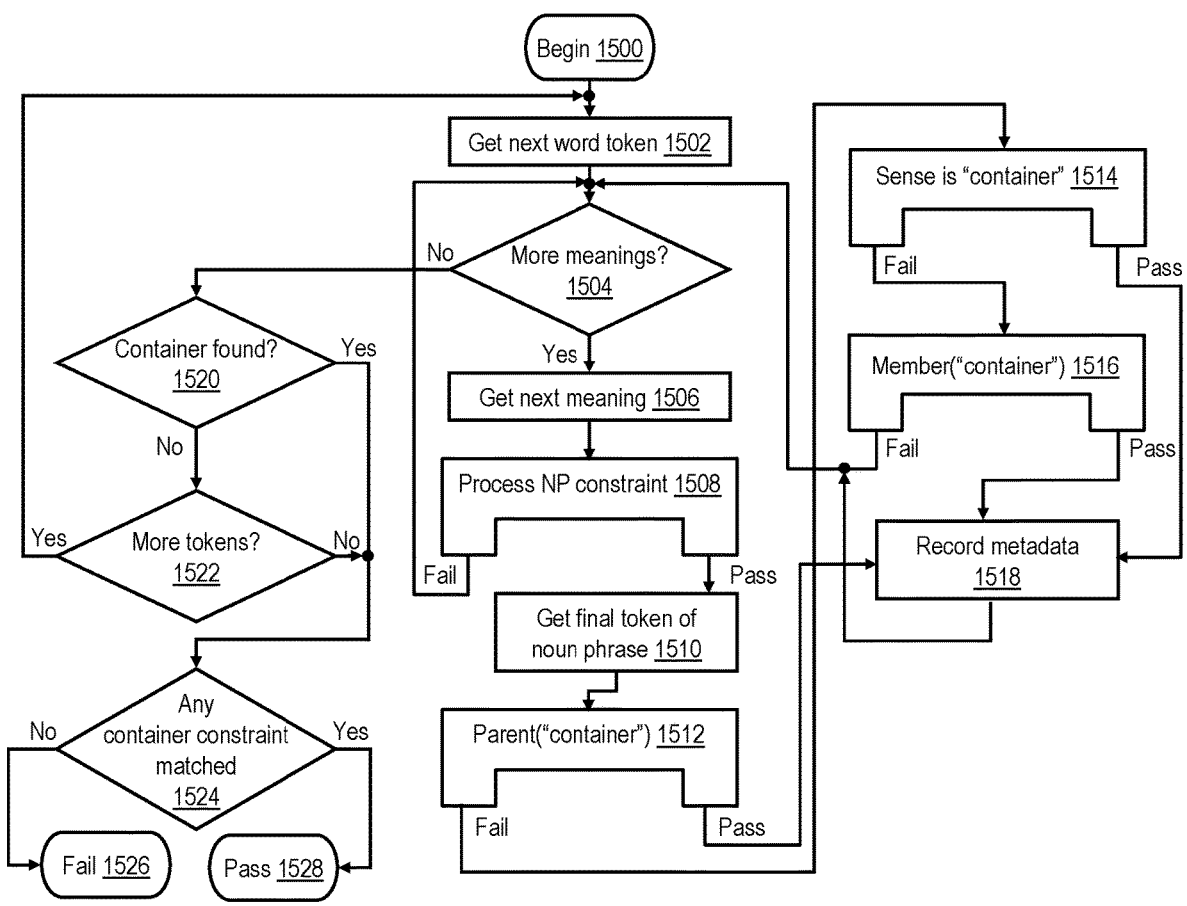
FIG. 15 is a high level logical flowchart of an exemplary process for processing an CNTR (Container) constraint in accordance with one embodiment.

With the foregoing discussion regarding constraint matching as background, reference is now made to FIG. 15, which illustrates a high level logical flowchart of an exemplary process for processing an CNTR (container) constraint in accordance with one embodiment. As an example, the CNTR constraint may be specified in the constraint of a meaning signature of the preposition "into" in the form "into CNTR", with the intention that this constraint be used to match such phrases as "into the cold lake", "into the room", "into my coffee cup". Thus, the CTNR constraint returns a pass only if the word (or noun phrase) following the preposition "into" is a container of some type. As discussed further below, the CNTR constraint is a nested constraint that references additional lower level constraints.

The process of FIG. 15 begins at block 1500, which illustrates the invocation of the CNTR constraint handler by parser 204. The process proceeds from block 1500 to block 1502, which illustrates the CNTR constraint handler accessing the token storage area 114 of the current word token in the parse scan. Next, at block 1504, the CNTR constraint handler determines whether or not the current word token has any additional meaning signature that has not been processed. If not, the process passes to block 1520, which is described below. If, however, the CNTR constraint handler determines that an additional meaning signature of the current word token remains to be processed, the process passes to block 1506.

Block 1506 illustrates CNTR constraint handler accessing the next meaning signature of the current word token. The CNTR constraint handler then attempts to match the current context against an NP constraint (block 1508). To match the NP constraint, the CNTR constraint handler invokes the NP constraint handler, whose operation is described in greater detail below with reference to FIG. 16. If the NP match fails, it is not possible for the current meaning signature to match a container because a container is defined in an NP. Consequently, the CNTR constraint handler aborts further attempts to match the current meaning signature, and the process returns to block 1504, which has been described. However, if the NP match passes, the process proceeds to block 1510.

At block 1510, the CNTR constraint handler locates the final word token in the noun phrase, which is guaranteed to be a noun or some word/phrase acting as a noun. The CNTR constraint handler then determines at blocks 1512-1516 whether or not the noun is a container of some form. For example, at block 1512 the CNTR constraint handler determines whether or not a meaning in the noun's parent hierarchy specifies the class "container". If so, the CNTR constraint handler saves that metadata in the token storage area 114 (block 1518) and loops back to block 1504, which illustrates processing the next meaning, if any, of the current token. In response to failure of the constraint match illustrated at block 1512, the CNTR constraint handler traverses the noun's sense link to determine if the sense node or any of its parent nodes has membership in the class "container"

(block 1514). If so, the process passes to block 1518, which has been described. However, if no constraint match is found at block 1512 or block 1514, the CNTR constraint handler determines at block 1516 whether the current meaning is a member of a class called "container". For example, the container might be a glass, a box, room, an ocean, coffee cup, dump truck or the like. If the noun is a member of any of these classes, then a match is found, and the process passes block 1518. If no match is found at block 1516 (i.e., the constraint fails), then the process returns to block 1504.

Referring now to block 1520, if no match for a container has been found after processing all meanings of the current token, then the process passes to block 1522; otherwise, the process proceeds to block 1524. At block 1522, the CNTR constraint handler determines whether or not more tokens remain to be processed by the CNTR constraint handler. If so, the process returns to block 1502, which has been described. If not, the process passes to block 1524. At block 1524, the CNTR constraint handler determines whether any container constraint as illustrated at block 1512-1516 found a match. If not, the CNTR constraint handler reports a failure to parser 204 and terminates at block 1526. If, on the other hand, the CNTR constraint handler found a match for a container, the CNTR constraint handler reports a pass to parser 204 and terminates at block 1528.

Even if the attempt to match the CNTR constraint fails, the CNTR constraint processors may have still improved the accuracy of the parse, for example, by matching some word meanings (e.g., determiner (DET), adjective (ADJ) and noun (N) of the noun phrase (NP)). By identifying these words once and for all, subsequent right-to-left constraint matching is both possible and faster.

Figure 16:
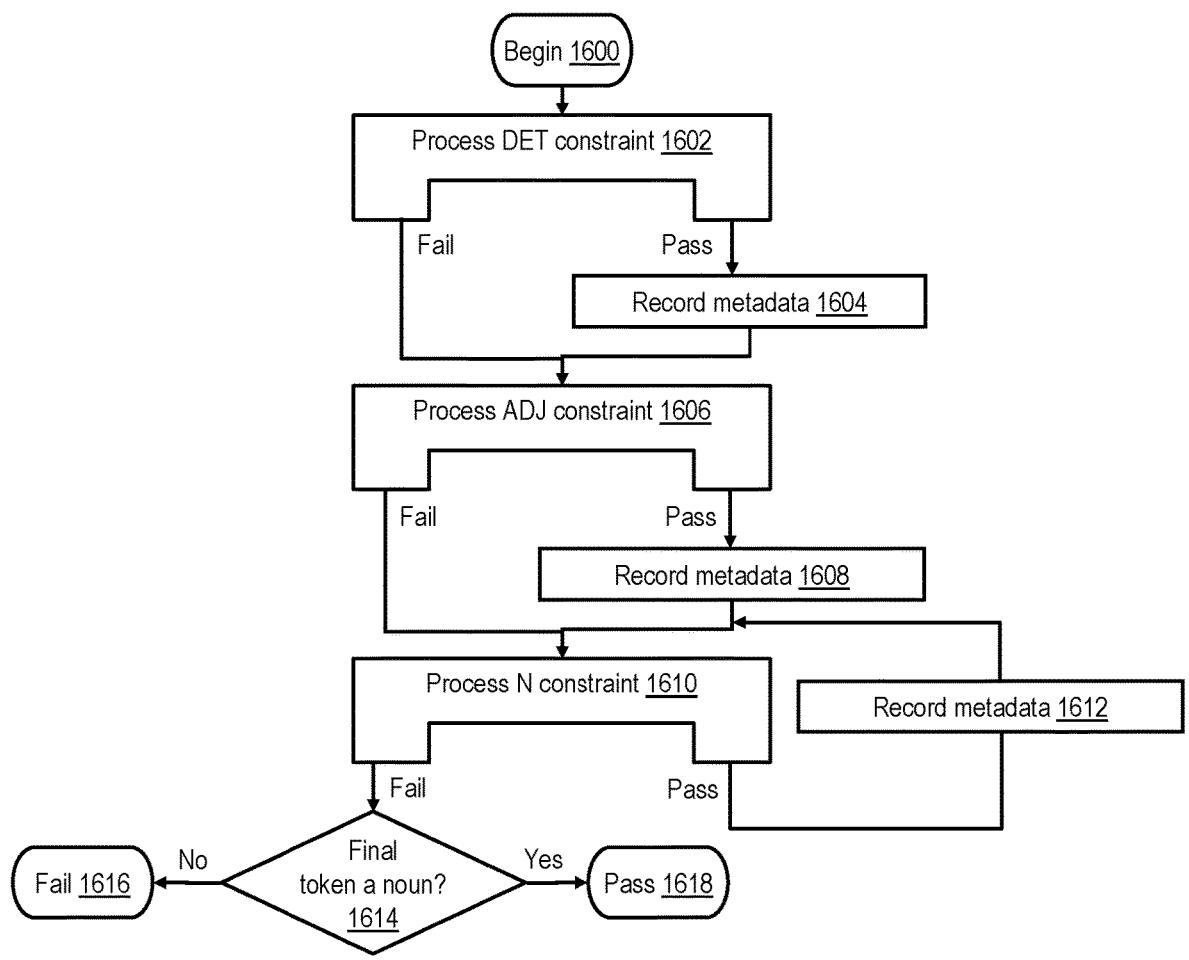
FIG. 16 is a high level logical flowchart of an exemplary process for processing a NP (Noun Phrase) constraint nested within the CNTR constraint in accordance with one embodiment.

Referring now to FIG. 16, there is depicted a high level logical flowchart of an exemplary process for processing a NP (noun phrase) constraint nested within the CNTR constraint in accordance with one embodiment. The process begins at block 1600, for example, in response to invocation of the NP constraint handler by the CNTR constraint handler at block 1508 of FIG. 15. The process passes from block 1600 to block 1602, which illustrates the NP constraint handler processing the DET (Determiner) constraint (e.g., by invoking a DET constraint handler) to attempt to find an optional determiner ("a", "an", "the", etc.) of a noun phrase at the present parsing context. If a determiner is identified, the NP constraint handler records metadata identifying the determiner in the relevant token storage area 114 (block 1604). Following block 1604 or if no determiner is found at block 1602, the process passes to block 1606.

Block 1606 depicts the NP constraint handler processing the ADJ (Adjective) constraint (e.g., by invoking an ADJ constraint handler) to attempt to find an optional adjective of a noun phrase at the present parsing context. If an adjective is identified, the NP constraint handler records metadata identifying the adjective in the relevant token storage area 114 (block 1608). Following block 1608 or if no determiner is found at block 1606, the process passes to block 1610.

Block 1610 illustrates the NP constraint handler processing the N (Noun) constraint (e.g., by invoking a N constraint handler) to attempt to find the mandatory noun of a noun phrase at the present parsing context. If an noun is identified, the NP constraint handler records metadata identifying the noun in the relevant token storage area 114 (block 1612), and the process continues to loop back and identify additional nouns until no more nouns are found. Following a determination at block 1610 that the N constraint fails, meaning no additional nouns within the NP have been found, the process passes to block 1614.

At block 1614, the NP constraint handler determines whether or not the final token identified by the NP constraint is a noun. If not, the NP constraint handler reports failure to parser 204 and terminates at block 1616. If, however, the NP constraint handler determines that the final token identified by the NP constraint handler is a noun, the NP constraint handler reports a pass to parser 204 and terminates at block 1618.

Figure 17:
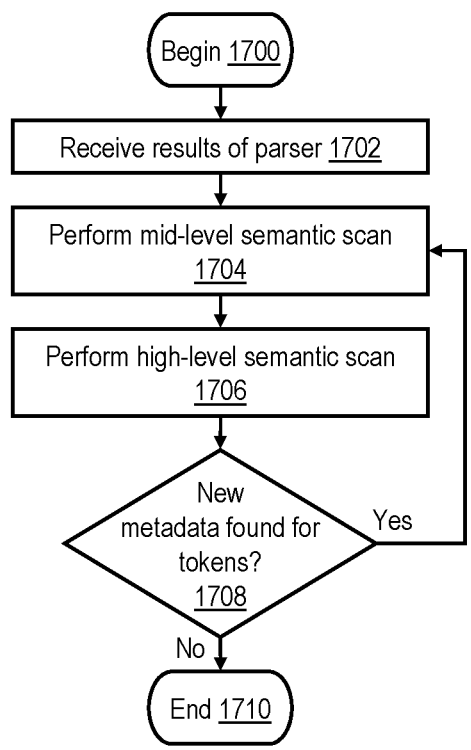
FIG. 17 is a high level logical flowchart of an exemplary process for performing semantic analysis of a sentence or sentence fragment utilizing an ANLP in accordance with one embodiment.

With reference now to FIG. 17, there is illustrated a high level logical flowchart of an exemplary process for performing semantic analysis of a sentence or sentence fragment utilizing an ANLP 110 in accordance with one embodiment. The illustrated process provides additional detail regarding the semantic analysis performed at block 818 of FIG. 8.

The illustrated process begins at block 1700 and then proceeds to block 1702, which depicts semantic analyzer 214 of ANLP 110 receiving the results of the parsing performed on a sentence or sentence fragment by parser 204, for example, by accessing the associated token list 116. Based on the results of the parsing performed by parser 204, semantic analyzer 214 performs a mid-level semantic scan to discover (to the extent possible), the mid-level information summarized in Table 1 (block 1704).

As indicated in Table 1, the metadata discovered by the mid-level semantic analysis can include clausal structures (e.g., dependent or independent clauses, locatory references, etc.), sentence structures (e.g., subject, predicate, direct object, indirect object, object of the preposition, etc.), classical linguistic roles (e.g., actor/experiencer, giver/receiver, tool/means, etc.), and cause-effect and inferential source content. The identification of clausal and sentence structures builds upon the phrasal structures already identified by parser 204. Semantic analyzer 214 can identify the clausal and sentence structures by applying pattern-matching heuristics to the phrasal structures. Semantic analyzer 214 can additionally determine the linguistic roles from classifications of the word tokens and phrasal structures. For example, the prior identification of a verb type as indicative of a transaction can lead to the assignment of a Giver and a Receiver to their respective noun phrases. The automatic classification of noun phrases with a type, such EPOCH, TOPIC or the like makes the determination of roles even more robust. Semantic analyzer 214 can determine cause and effect semantics based, for example, on clausal structures such as "if", "while", "when" and "during" clauses, which juxtapose occurrences and the actors or conditions causing them. Each of these can preferably be identified as a constraint. The match process iterates over a series of such constraints in a similar way as done for the CTNR constraint in FIG. 15. Identification of cause and effect semantics allows both deduction of new information from known facts as well as inference (i.e., the conjecture of missing information) without the requirement or use of intelligent neural agents.

At block 1706, semantic analyzer 214 additionally performs a high-level semantic scan based on the results of parser 204 and the mid-level semantic scan to discover, to the extent possible, the high-level information summarized in Table 1. As indicated, this high-level information can include intention, positions and goals, causality, invalid premises underlying the content, emotional implications of content, cultural, political, and/or religious implications of content, and predictor of future intent, as now discussed in greater detail.

Semantic analyzer 214 can identify intentions and goals from predetermined classes of both nouns and verbs that tend to indicate intention, motivation, desire and goals. By making the meanings belonging to this predetermined vocabulary set members of a class within CMF 208 such as "intention", membership in these classes can be readily determined by semantic analyzer 208. Modal words such as "will", "shall" and others are one such indicator of intent. Non-modal words such as "want" may also suggest intention, depending upon their specific meaning.

Underlying many sentences are premises that a speaker (whether the author or a third party) purports to be true. These premises, which may in fact be falsehoods or fallacies, can be identified by semantic analyzer 214. For example, the sentence, "You can often find green people smoking outside the south doorway" contains several premises subject to validation. These premises include:

People can be "green";
People "smoke", whether themselves or from burning another material (e.g., tobacco);
People can be "found";
A "south doorway" exists; and
People can be found outside a doorway.

Each premise can be validated as true, false or unknown, based upon what is presently contained in the knowledge set represented by CMF graph 208. If one or more premises of a sentence are found to not be true, the high-level semantic analysis performed by semantic analyzer 214 can suggest one or more of these alternative analytic results for the sentence: (1) It is an attempt at humor; (2) It is a statement made in ignorance, (3) It is a statement made to deceive, and/or (4) more knowledge required to evaluate.

With respect to the detection of emotion, semantic analyzer 214 employs non-statistical semantic analysis to extract emotional content, intention, causation and many other elements of communication. The emotional content that is detected can include not only the emotion sensed in a speaker (e.g., the author of the sentence or a third party discussed by the speaker), but also evocative emotional content that is intended to be evoked within the reader/hearer of the sentence or subject of the sentence. For example, consider the sentence: "The hardy bird eked meager subsistence from the early winter forest floor." In this sentence, "eked" is intended to evoke in the reader the suggestion of hopelessness and uncertainty. This exemplary sentence also illustrates the need for proper sense of each word, if the underlying meaning of each word is to be interpreted. For example, does the proper sense of "early" suggest seasonal shift (i.e., winter came early this year) or that the chronological context is the earlier portion of the winter season? Conventional grammar and statistics-based parsing cannot readily discover which nuance is intended with much certainty. However, the disclosed constraint-based approach to semantic analysis yields greater certainty in the choice of meaning. As another example, consider the sentence: "This is an ugly proposition handed to us!" In this sentence, a strong feeling is suggested by the exclamation point, disgust and objection are suggested by the phrase "handed to us", and distaste is suggested by the phrase "an ugly proposition". The graph nodes for each of these word meanings will contain link(s) to the associated emotion node(s).

As represented by block 1708, semantic analyzer 214 repeats block 1704 and 1706 until no new metadata is created for the tokens within the current sentence or sentence fragment. Like the word meanings, all the metadata gleaned by semantic analysis may be stored in data storage 104 as graph structured nodes to enable the system to learn as the knowledge set grows. Following block 1708, the process of FIG. 17 terminates at block 1710.

Figure 18:
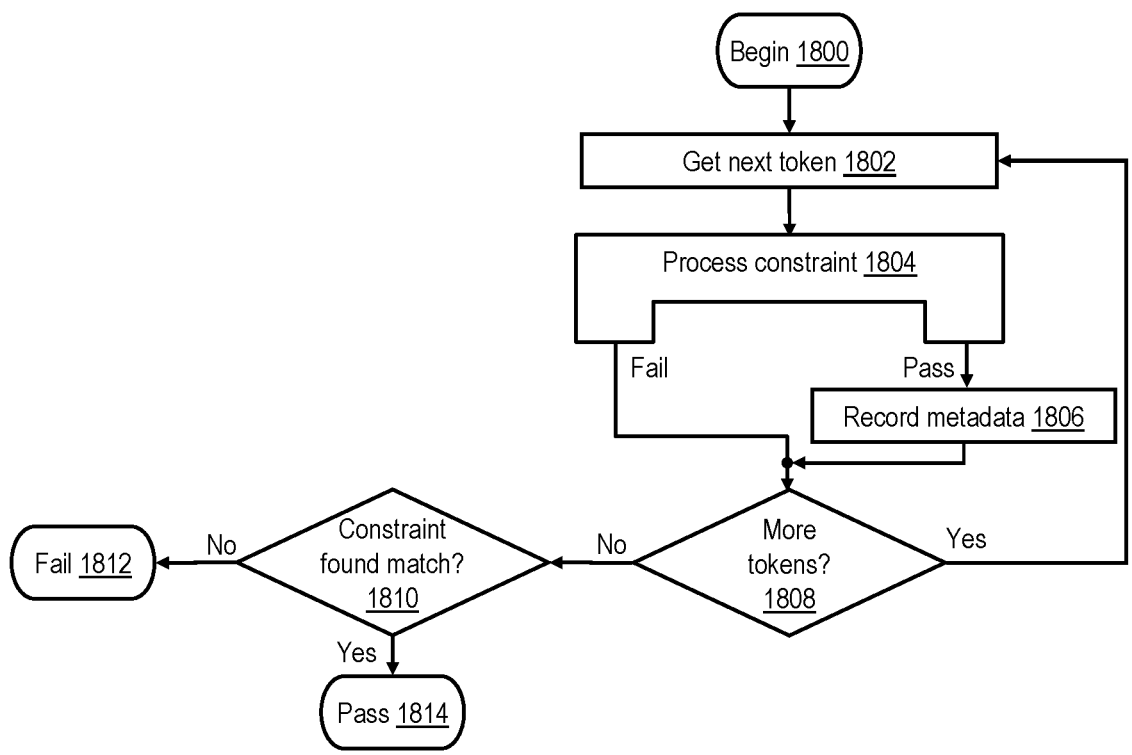
FIG. 18 is a high level logical flowchart of an exemplary process for constraint processing during semantic analysis processing in accordance with one embodiment.

Referring now to FIG. 18, there is depicted a high level logical flowchart of an exemplary process for constraint processing during mid-level semantic analysis processing in accordance with one embodiment. The process given in FIG. 18 can be initiated, for example, at block 1704 of FIG. 17.

As noted above, the goal of mid-level semantic analysis is to determine higher level sentence structures, as well as linguistic roles and cause/effect relationships. In determining sentence structures, semantic analyzer 214 builds upon the parts of speech and phrasal structures previously identified by parser 204. At a higher level, a Verb, Indirect Object, Direct Object, etc. may be seen as forming a Predicate of the sentence. At the highest level, the sentence might be viewed as simply being composed of a Subject and Predicate. This analysis may be performed by iterative application of constraints using the process of FIG. 18. For example, consider the sentence: "That song is a walk in the park!" This sentence can be analyzed (e.g., by parser 204) by its parts of speech as follows:

That (Det) song (Noun) is (Verb) a (Det) walk (Noun) in (Prep) the (Det) park! (Prep Obj)

In addition, the sentence can be analyzed by parser 204 and/or semantic analyzer 214 at a higher level as:

[That song] (Subject) [is] (Verb) [a walk in the park] (Predicate Nominative)!

The semantic analyzer 214 can next analyze the sentence as a Subject and a predicate, with "that song" forming the Subject and "is a walk in the park" forming the Predicate. The exclamation at the end of the sentence can be interpreted as a higher degree of emotional ownership in the sentence content.

The process FIG. 18 identifies a higher level semantic structure of a sentence or sentence fragment using constraint matching similar to that employed by parser 204. However, rather than applying constraints to the meanings of word tokens, semantic analyzer 214 identifies the semantic structures utilizing constraint handlers that recognize in the previously determined metadata's constituent semantic structures, such as prepositional phrases and the like. Thus, by determining which of a predetermined set of constraint handlers match the sentence or sentence fragment, the entire sentence structure can readily be discovered.

For example, a typical constraint for PP could take the form: "PREP [DET] NP", where "PREP" represents a nested Preposition constraint, "[DET]" represents a nested constraint for an optional Determiner, and "NP" represents a nested constraint for a Noun Phrase. One skilled in the art will realize that additional constraints can be formed to identifying various semantic components at differing levels of sentence structure. For example, additional constraints employed for semantic analysis can include:

Independent Clause 1 (IC1)=SUBJ VP IDO DO
Independent Clause 2 (IC2)=SUBJ VP [DO]
Independent Clause (IC)=IC1 or IC2
Sentence 1 (S1)=IC '.' or IC CONJ IC '.'
Sentence 2 (S2)=IC CONJ DC
Sentence (S)=S1 or S2 where SUBJ is a subject, VP is a verb phrase, IDO is an indirect object, DO is a direct object, square brackets indicate optionality, CONJ is a conjunction, and DC is a dependent clause. It should be noted that each constraints involve the matching of constraints to tokens independently of any word meanings.

The process of FIG. 18 begins at block 1800 and then proceeds to block 1802, which illustrates semantic analyzer 214 accessing a next (or first) token in a token list 116 by accessing the associated token storage area 114. At block 1804, semantic analyzer 214 then processes a constraint from a suite of semantic analysis constraints beginning at the current token of the sentence or sentence fragment (e.g., the PP constraint given above). This differs from most previous descriptions here in that the constraint string is externally supplied, rather than being one supplied in the word meaning. As described above, semantic analyzer 214 preferably processes the constraint by calling a respective associated constraint handler 212. If a match is found beginning with the current token, the constraint passes, and semantic analyzer 214 records the discovered metadata in the relevant token storage area(s) 214 (block 1806). Preferably, the metadata is stored utilizing the same format as the other semantic information previous discussed.

Following block 1806 or block 1804 (in response to the constraint failing), the process passes to block 1808, which depicts semantic analyzer 214 determining whether or not the token list 216 includes any additional tokens that have not been used as the starting token to match the current constraint. If so, the process returns to block 1802 which has been described. If, however, semantic analyzer 214 determines at block 1808 that the current constraint has been matched against the token list 216 using each token as the initial token to match, the process passes to block 1810. Block 1810 illustrates semantic analyzer 214 determining whether or not the present constraint found any match in the token list 216. If not, the semantic analyzer 214 determines that the constraint failed and terminates the current scan at block 1812. Otherwise, semantic analyzer 214 determines that the constraint passed and terminates the current scan at block 1814.

As indicated above with reference to FIG. 17, semantic analyzer 214 can apply the various semantic analysis constraints within its suite of constraints repeatedly (and in any order) until no new metadata is created. In this manner, more basic semantic information, such as parts of speech, phrasal structures and clausal structures, are successively recognized as forming larger structures like phrases, clauses and sentences. After the completion of the mid-level semantic scans, the majority of information needed to fully identify all sentence structures is available and matched.

At the completion of the process of semantic analysis illustrated in FIG. 17, a sentence may not be fully comprehended for a variety of reasons, including the presence of unknown or misspelled words, constraints of known words that do not match the sentence, or multiple meanings of the same word match the sentence context (an ambiguity). As with a failure to parse, the failure may be resolved by ANLP 110 throwing an exception to a higher level of software. Alternatively or additionally, the failure may be resolved by querying a user or administrator for resolution, for example, by requesting a definition of an unknown word, resolving ambiguity by prompting for selection of one of the known meanings of a word, prompting for a corrected spelling if a misspelling is suspected, prompting for entry of an improved constraint, etc.

In the previous description, it has generally been assumed for ease of discussion that a constraint performs matching beginning with the token in the token list 116 representing the current context of a parse scan or semantic analysis scan. However, in at least some embodiments, it is preferred if constraint handlers 212 perform constraint matching utilizing any of here-to-right, left-to-here-to right, from right-to-left matching, where "here" refers to the current token within the token list 116. At the lowest level scan, here-to-right constraint matching may be more likely to result in a match. However, in semantic analysis, matching may be more successful utilizing a left-to-here-to-right match or right-to-left match, which is especially suitable when identifying the main verb or larger clause structures. As an example, consider a Sentence constraint having the form IC, CONJ DC, which would match the sentence, "Most bands play very loudly, but not all." If a constraint handler 212 has "but" as the current word token, the constraint handler 212 must first match the "but" with the CONJ, then move to the left to see if an Independent Clause was found, and finally move to the right in an attempt to match the DC (Dependent Clause).

In addition, it may be desirable to change which form of matching is employed for a given constraint between scans. For example, the word token "time" might have an associated constraint for one of its meanings, such as "over time". When the word "over" is encountered in the scan, the constraint will be processed with the parse index indicating "time" as the current token. To resolve "over" as matching the phrase specified in the constraint, the index would need to perform matching left-to-here. In this example, it is convenient if one or more initial pass(es) to ignore constraints not starting at the current word token. Subsequent passes can then reasonably attempt to process these constraints for any unmatched tokens.

It will be appreciated that ANLP 110 may need to communicate its CMF graph 208 and/or the results of its processing to NL-to-RDF converter 222, AI system 230 or another application or system. Conventional serialization may conveniently convert the in-storage versions of CMF graph 208 and the metadata discovered by ANLP 110 into a data file or data stream. In some case, there may be need to store or communicate processing results of ANLP 110, but without the requirement that an entire graph be stored or communicated. In such cases, both the parent and sense of a meaning can be communicated. If the receiver already is aware of the word meaning, then only the sense needs to be communicated.

In some cases, all of the information needed for automated comprehension of a sentence is contained in the sentence itself. For sentence fragments, this is less often the case. In at least some embodiments, it is therefore desirable to enable ANLP 110 to retain information gleaned from an individual sentence or clause to facilitate comprehension of one or more subsequent clauses, sentence fragments, and/or sentences. By referring to the retained information, ANLP 110 can narrow the possible scope of the abstract and intangible, transforming the vague and imprecise to concrete people, things and identities.

For example, consider the following exemplary natural language communication:

The man in the mirror gazed at his reflection, disheartened that age and sunlight had been unkind. The scar was yet evident, unobscured by time, though diminished in sharpness. As it gave his features a certain character, John Croft didn't mind, though . . . too much.

In this communication, contextual information within this communication can be summarized in Table 4 below:

TABLE 4

| Text | Contextual information |
| --- | --- |
| "The man in the mirror" | Defines narrowly who is involved, though unnamed |
| "age and sunlight" | Actors in the process |
| "evident, unobscured by time" | Lack of change |
| "diminished in sharpness" | Less clarity |

TABLE 4-continued

| Text | Contextual information |
|---|---|
| "As it gave his features a certain character" | A causal |
| "John Croft" | The resolving antecedent for "man in the mirror" |
| "Didn't mind . . . too much" | Expression of very low-intensity concern |

As indicated in Table 4, the meaning of some of the earlier sentences is made clear by metadata provided by subsequent sentences. In order to support the comprehension of meanings spanning sentences, ANLP 110 can persist at least some of the metadata between sentences in data storage 104.

With reference now to FIG. 19, there is illustrated an exemplary data structure, referred to herein as an activity group (AG), which can be utilized to store metadata for an independent or dependent sentence clause in accordance with one embodiment. An AG 1900 can be referenced by other AGs 1900 and can further be attached as a property to various word-meaning nodes referenced in it. AG 1900 supports higher-level semantic analysis and/or higher-level brain function emulation. It can also used by a higher-level Discourse engine (e.g., in AI system 230) that can create a hierarchy-based discussion about any word in CMF graph 208.

In the illustrated embodiment, AG 1900 is implemented as a variable-length list of metadata items. AG 1900 can optionally include a type field 1902, which contains a reference or code indicating that the data object is an activity group. Some program languages, such as C# and Java, can alternatively obtain this same information by "reflection" of the object. In addition, AG 1900 includes a property map 1904, which is a simple list or other data structure specifying facets of the activity occurring in the activity group, for example, in a variable length list of key-value pairs.

In at least one embodiment, the keywords given in property map 1904 are taken from classical linguistic thematic roles. Except as indicated, these are references to other nouns, objects or other AGs. Only those roles that are relevant to a particular AG 1900 are included in its property map 1904. In some embodiments, for sake of memory efficiency, these references in the name-value pairs could consist of a short pre-enumerated keyword, with the value address reference consisting instead of an index into a longer table of reference addresses. An exemplary list of useful roles is given below in Table 5, although additional roles can be defined as needed. It will be appreciated, however, that there must be agreement between the program code producing the metadata populating property map 1904 and the program code consuming the metadata as to the intent and usage of these roles.

TABLE 5

| Key | Value |
|---|---|
| Action | A reference to a verb |
| Action Infinitive | The action taken, which may be specified by the equivalent of an infinitive phrase |
| Action Alternative | A reference to an activity that is undertaken if a condition is not met. It is similar to an "else" clause or the below "meanwhile" clause. E.g., "When the committee agrees, kill the program. Meanwhile, continue work on it." |
| Agent | A person, thing or condition used to affect the Action of this AG, the instigator or means of accomplishing the goal |
| Attribution | A reference to an instance of an individual, organization, text file or other source supplying this information. Example: The attribution could be a reference to the URL of a training file, to a specific individual, URL of a web site, magazine or the like. |
| Causal link | The cause of an Action or state |
| Condition for action | The condition of an Action, e.g., "If there is time, we clean up." |
| Epoch | A specific point in history (e.g., "yesterday" or "about 1500 B.C.") |
| Experiencer | A person experiencing emotion. Example: "Jason was giddy." This explicitly refers to some experienced emotion, perhaps as a result of the Action. (It should be noted that emotions are temporal, if current emotional state is important. What was true at the time of the parsing will by definition be true shortly thereafter.) |
| Flags | Indication of verb aspects, such as infinitive only (e.g., to walk), verb tense, etc. |
| Goal | A condition, object, location or instance representing the goal for the AG |
| Intention | The Agent's likely purpose as specified by an infinitive (e.g., "to waste our time") |
| Location | The location where the Action occurred |
| Means | A tool or means used to perform the Action |
| Method | The process by which energy was applied to perform the Action |
| Owner | An entity (e.g., a person) that is the actual owner of an object. (An entity may possess yet not own an object.) |
| Patient | An entity undergoing the Action. Example: "I (Thomas) stumbled upon the answer," or, "David destroyed the book." The Patient is related to Theme and may be found in the Subject or Direct Object (DO) of a sentence. |
| Personal identity | The identity of an instance of a person |
| Possessor | An entity presently possessing an object, usually the result of an Indirect Object/Object pair. Example: "I gave Mary a hard time." The Possessor is also sometimes called a Recipient. |
| Theme | An event (possibly infinitive) denoted by the predicate. Theme is a weaker identification than Topic. See also Action Infinitive, above. |
| Time | A specific time, with optional day or date (e.g., Friday at 12:01 P.M) |
| Timestamp | The date and time on which this Action was disclosed (i.e., the date when the text was processed by ANLP 110) |

TABLE 5-continued

| Key | Value |
| --- | --- |
| Topic | A pointer/reference to any AG, infinitive or noun that is the implied topic of the AG. This identification is more definitive than Theme. Example: In "I stumbled upon the answer," a suitable Topic might be "enlightenment". |

Referring now to FIG. 20, multiple AGs 1900 as illustrated in FIG. 19 can be structured within data storage 104 to provide a current communication context for a stream of communication provided by a natural language communication source 210. In particular, FIG. 20 depicts an exemplary current context data structure (CCDS) 2000, realized as a table, list or other data structure formed of N AGs 1900, where N is a positive integer. ANLP 110 can employ any one or a combination of methodologies, such as first-in, first-out (FIFO) or least recently used (LRU), to determine which, if any, of the AGs 1900 within CCDS 2000 can be removed and/or replaced from CCDS 2000. For example, in one particular embodiment, CCDS 2000 can be implemented as a circular list, with an index that denotes the most recently created AG 1900.

In an alternative embodiment, CCDS 2000 can be implemented as a table containing "flat" activity group records (rows) in which all supported roles are laid out in columns and in which a column entry is only filled in if such a role is present in the metadata of the corresponding AG. This format is more suitable for rapid access to information, for example, to scan the most recent Topics to see if the current Topic differs from previous ones. Such change of Topic can be detected as equivalent to the boundary between paragraphs, for example, and may be used by ANLP 110 as a trigger to create a new AG that "rolls-up" or summarizes the contents of the next paragraph.

Regardless of the layout employed for AGs 1900 and CCDS 2000, each AG 1900 in CCDS 2000 preferably corresponds to a single paragraph of communication. Semantic analyzer 214 can work backwards from the most recently formed AG 1900 as necessary to resolve the meanings of previously vague terms, such as pronouns and unknown words, and to update keyword-value pairs (e.g., Topic) as more information becomes available.

One consequence of the ability of ANLP 110 to synthesize metadata across the boundaries of clauses, sentence fragments and/or sentences is a reduction in the amount of underlying data that must be preserved for comprehension. A general goal in knowledge storage is to discard the maximum possible amount of original content, for example, the content received from natural language communication source(s) 210, while retaining the knowledge gleaned from the original content. ANLP 110 satisfies this goal by resolving setup information such as the time, locality, identity, conditions for action and the like to concrete numbers, specific instances of locations, people and objects, and references to commonly used activity conditions. Once the setup information is resolved and the learned metadata is recorded, the original content becomes irrelevant and discardable.

The ability of ANLP 110 to synthesize metadata across the boundaries of clauses, sentence fragments and/or sentences also supports the implementation of a Discourse engine in AI system 230. The Discourse engine can access metadata recorded in CCDS 2000 and reform the information contained therein into cogent human-language phrases, but usually with different wording than the original textual content. In one particular embodiment, the Discourse engine supports automated comprehension of an input language, such as Russian or Chinese, while interpreting and learning the content in a target language knowledge set (e.g., an English knowledge set). Such an implementation enables the translation of one language to another, but restating the concepts defined or described in English, rather than word-for-word translation. In this usage it can also be seen that conceptual knowledge can be maintained in English, but with a Discourse engine reformed to emit that knowledge in Arabic, for example. Similarly, this parser can be used to render Arabic language into an English knowledge set, for example.

As has been described, an ANLP 110 as disclosed herein has a number of capabilities and features, including the capabilities to: extract parts of speech, semantic, and psycho-linguistic information; identify the exact sense (meaning) of each word, even in the presence of many meanings; recursively apply constraints utilizing an implied OR structure; identify the main verb, idioms and other key components of a sentence; extract and identify nuance and emotion; efficiently create and store a knowledge base using dual-edged graph nodes that provide both what-it-is and what-it-means information.

In some embodiments, a consistent meaning framework (CMF) graph including a plurality of nodes linked by a plurality of edges is maintained in data storage of a data processing system. Multiple nodes among the plurality of nodes are meaning nodes corresponding to different word meanings for a common word spelling of a natural language. Each of the multiple word meanings has a respective one of a plurality of associated constraints. A natural language communication is processed by reference to the CMF graph. The processing includes selecting, for a word in the natural language communication, a selected word meaning from among the multiple word meanings based on which of the plurality of associated constraints is satisfied by the natural language communication. An indication of the selected word meaning is stored in data storage.

While the present disclosure has been particularly shown as described with reference to one or more preferred embodiments, it will be understood by those skilled in the art that various changes in form and detail may be made therein without departing from the spirit and scope of the disclosure. For example, although the inventions have been described with reference to a programmed data processing system, it will be appreciated that the inventions can be implemented as a program product including a storage device (e.g., a magnetic or optical disk, memory device, or the like, but excluding transitory propagating media per se and signals per se) that stores program code that, when executed, causes the data processing system to perform some or all of the disclosed functions.

What is claimed is:

1. A method in a data processing system of generating a response to a natural language communication, the method comprising:

prior to receipt by the data processing system of a natural language communication for processing, maintaining, in data storage of the data processing system, a consistent meaning framework (CMF) graph providing word meanings for various word spellings of a natural human language, wherein the CMF graph includes a plurality of nodes linked by a plurality of edges, and wherein the plurality of nodes includes:

a plurality of meaning nodes each specifying a respective word spelling, wherein each of the plurality of meaning nodes is linked by a respective one of the plurality of edges to another meaning node serving as a parent node indicating what the word spelling means, and wherein at least two of the plurality of meaning nodes correspond to different word meanings for a common word spelling of the natural human language; and a plurality of sense nodes each linked to a respective one of the plurality of meaning nodes by one of the plurality of edges, each of the plurality of sense nodes having a respective associated sense defined by a natural language textual description indicating a word meaning to which the linked meaning node among the plurality of meaning nodes refers, such that different word meanings of the common word spelling can be disambiguated;

in response to receipt by the data processing system of the natural language communication, a processor of the data processing system processing the natural language communication by reference to the CMF graph, wherein the processing includes parsing the natural language communication and selecting, for each of multiple word spellings in the natural language communication, a selected word meaning from among the word meanings provided by the CMF graph; and based on results of the processing, the processor outputting a natural language response to the natural language communication.

2. The method of claim 1, and further comprising:
maintaining, in data storage, a words map of word spellings, wherein the words map indexes into each of the plurality of meaning nodes in the CMF graph.

3. The method of claim 1, wherein:
multiple of the word meanings are each associated by the CMF graph with a respective one of a plurality of constraints defining a grammatical class of word meaning and indicating a sense of word meaning; and
the selecting includes selecting word meanings from among the word meanings provided by the CMF graph based on which of the plurality of associated constraints is satisfied by the natural language communication.

4. The method of claim 3, wherein the selecting includes determining whether or not one of the associated constraints is satisfied by a root word of a word spelling appearing in the natural language communication.

5. The method of claim 3, wherein the selecting includes determining whether or not one of the associated constraints is satisfied by at least one of a set including testing a word meaning for membership in a specified class, testing a word meaning for compatibility with a linguistic role, and testing a sense of a word meaning.

6. The method of claim 3, wherein the parsing includes parsing the natural language communication utilizing constraints to identify phrasal structures in the natural language communication and recording the phrasal structures in data storage.

7. The method of claim 3, wherein the processing includes parsing the natural language communication in a direction of the natural human language until no additional constraints are satisfied and then parsing the natural language communication in a reverse direction.

8. The method of claim 3, wherein the parsing includes applying multiple nested constraints to determine the selected word meaning for at least one word spelling in the natural language communication.

9. The method of claim 8, wherein the applying includes applying a first constraint for a first word spelling and applying a second constraint for a second word spelling, wherein both of the first and second constraints invoke a third constraint.

10. The method of claim 8, wherein the applying includes applying a first constraint to a multi-word phrase of the natural language communication and applying a second constraint to an individual word spelling in the multi-word phrase.

11. The method of claim 10, wherein:
the first constraint defines grammatical structure of the multi-word phrase; and
the second constraint qualifies a part of speech of the individual word spelling.

12. The method of claim 1, and further comprising:
prior to the processing, tokenizing the natural language communication, wherein the tokenizing includes:
allocating, in data storage, a respective token storage area for each of the multiple word spellings in the natural language communication; and
storing in a given token storage area a reference to a word meaning and a semantic data type determined via constraint-based parsing.

13. The method of claim 1, wherein outputting the natural language response includes presenting an audible natural language response via a text-to-speech converter.

14. The method of claim 1, and further comprising the data processing system performing semantic analysis on the natural language communication and changing which of the plurality of meaning nodes are linked by at least one of the plurality of edges in the CMF graph based on the semantic analysis of the natural language communication.

15. The method of claim 14, wherein performing semantic analysis includes evaluating one or more constraints utilizing one or more constraint handlers.

16. The method of claim 1, and further comprising:
based on the parsing, the processor performing semantic analysis of at least a sentence fragment of the natural language communication to obtain at least mid-level comprehension information regarding the sentence fragment; and
the processor determining the natural language response based at least in part on the mid-level comprehension information.

17. The method of claim 1, wherein the natural language communication is in an input natural human language and the natural language response is in a different target natural human language.

18. The method of claim 1, and further comprising the processor determining the natural language response utilizing an artificial intelligence (AI) system.

19. The method of claim 1, wherein the natural language response includes at least one of a set including an indication of emotion evoked by the natural language communication and an indication of emotion implied by a communicator of the natural language communication.

20. The method of claim 1, wherein the natural language response includes at least one of a set including a topic of the natural language communication, a summary of the meaning of the natural language communication, and a summary of classical linguistic structure of the natural language communication.

21. The method of claim 1, wherein the natural language response includes an assessment of an intent of a communicator of the natural language communication.

22. The method of claim 1, wherein the natural language response includes a definition of one or more word spellings in the natural language communication.

23. A program product for generating a response to a natural language communication, the program product comprising:
- a storage device; and
- program code stored within the storage device, wherein the program code, when executed by a processor of a data processing system, causes the data processing system to perform:
  - prior to receipt by the data processing system of a natural language communication for processing, maintaining, in data storage of the data processing system, a consistent meaning framework (CMF) graph providing word meanings for various word spellings of a natural human language, wherein the CMF graph includes a plurality of nodes linked by a plurality of edges, and wherein the plurality of nodes includes:
    - a plurality of meaning nodes each specifying a respective word spelling, wherein each of the plurality of meaning nodes is linked by a respective one of the plurality of edges to another meaning node serving as a parent node indicating what the word spelling means, and wherein at least two of the plurality of meaning nodes correspond to different word meanings for a common word spelling of the natural human language; and
    - a plurality of sense nodes each linked to a respective one of the plurality of meaning nodes by one of the plurality of edges, each of the plurality of sense nodes having a respective associated sense defined by a natural language textual description indicating a word meaning to which the linked meaning node among the plurality of meaning nodes refers, such that different word meanings of the common word spelling can be disambiguated;
  - in response to receipt by the data processing system of the natural language communication, a processor of the data processing system processing the natural language communication by reference to the CMF graph, wherein the processing includes parsing the natural language communication and selecting, for each of multiple word spellings in the natural language communication, a selected word meaning from among the word meanings provided by the CMF graph; and
  - based on results of the processing, the processor outputting a natural language response to the natural language communication.

24. A data processing system for generating a response to a natural language communication, the data processing system comprising:
- a processor;
- a storage device coupled to the processor; and
- program code stored within the storage device, wherein the program code, when executed by the processor, causes the data processing system to perform:
  - prior to receipt by the data processing system of a natural language communication for processing, maintaining, in data storage of the data processing system, a consistent meaning framework (CMF) graph providing word meanings for various word spellings of a natural human language, wherein the CMF graph includes a plurality of nodes linked by a plurality of edges, and wherein the plurality of nodes includes:
    - a plurality of meaning nodes each specifying a respective word spelling, wherein each of the plurality of meaning nodes is linked by a respective one of the plurality of edges to another meaning node serving as a parent node indicating what the word spelling means, and wherein at least two of the plurality of meaning nodes correspond to different word meanings for a common word spelling of the natural human language; and
    - a plurality of sense nodes each linked to a respective one of the plurality of meaning nodes by one of the plurality of edges, each of the plurality of sense nodes having a respective associated sense defined by a natural language textual description indicating a word meaning to which the linked meaning node among the plurality of meaning nodes refers, such that different word meanings of the common word spelling can be disambiguated;
  - in response to receipt by the data processing system of the natural language communication, a processor of the data processing system processing the natural language communication by reference to the CMF graph, wherein the processing includes parsing the natural language communication and selecting, for each of multiple word spellings in the natural language communication, a selected word meaning from among the word meanings provided by the CMF graph; and
  - based on results of the processing, the processor outputting a natural language response to the natural language communication.

\* \* \* \* \*